US012589615B2

(12) United States Patent
Hamamura et al.

(10) Patent No.: US 12,589,615 B2
(45) Date of Patent: Mar. 31, 2026

(54) PNEUMATIC TIRE

(71) Applicant: SUMITOMO RUBBER INDUSTRIES, LTD., Kobe (JP)

(72) Inventors: Kenji Hamamura, Kobe (JP); Hiroki Kawai, Kobe (JP); Subaru Toya, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 18/017,594

(22) PCT Filed: Oct. 8, 2020

(86) PCT No.: PCT/JP2020/038096
§ 371 (c)(1),
(2) Date: Jan. 23, 2023

(87) PCT Pub. No.: WO2022/024402
PCT Pub. Date: Feb. 3, 2022

(65) Prior Publication Data

US 2023/0278372 A1 Sep. 7, 2023

(30) Foreign Application Priority Data

Jul. 28, 2020 (JP) ................................ 2020-127588

(51) Int. Cl.
*B60C 11/03* (2006.01)
*B60C 1/00* (2006.01)
*B60C 3/04* (2006.01)
*B60C 11/13* (2006.01)

(52) U.S. Cl.
CPC ................ *B60C 11/13* (2013.01); *B60C 1/00* (2013.01); *B60C 3/04* (2013.01); *B60C 2011/0341* (2013.01)

(58) Field of Classification Search
CPC ..... B60C 2011/0025; B60C 2011/0386; B60C 11/0304; B60C 11/03; B60C 11/00
See application file for complete search history.

(56) References Cited

U.S. PATENT DOCUMENTS 4,635,694 A 1/1987 Hosokawa
4,811,771 A 3/1989 Shoemaker et al.
4,840,210 A * 6/1989 Kukimoto ............... B60C 11/00 152/209.9
2010/0212795 A1* 8/2010 Murata ............... B60C 11/1323 152/209.18
2011/0094639 A1* 4/2011 Daisho ................ B60C 11/0302 152/209.5
2011/0098389 A1 4/2011 Yoo et al.
2014/0100316 A1 4/2014 Washizu
2014/0138003 A1 5/2014 Kuwayama et al.
2017/0021669 A1 1/2017 Kuwayama et al.
2017/0197465 A1 7/2017 Hatanaka et al.
2019/0168542 A1 6/2019 Hashimoto et al.
2019/0193464 A1 6/2019 Hamamura
2019/0375245 A1 12/2019 Miyazaki
2019/0375920 A1* 12/2019 Tsuchida ................... C08L 9/06
2020/0032037 A1 1/2020 Takano et al.
2020/0369087 A1* 11/2020 Matsui ................ B60C 11/0008
2021/0078367 A1 3/2021 Chaya

FOREIGN PATENT DOCUMENTS

CN 106457915 A 2/2017
CN 109153286 A 1/2019
EP 3 632 702 A1 4/2020
JP 57-147901 A 9/1982
JP 59-176104 A 10/1984
JP 2014-88544 A 5/2014
JP 2016-141317 A 8/2016
(Continued)

OTHER PUBLICATIONS

International Search Report for PCT/JP2020/038096 mailed on Nov. 10, 2020.
(Continued)

*Primary Examiner* — Cedrick S Williams
(74) *Attorney, Agent, or Firm* — Birch, Stewart, Kolasch & Birch, LLP

(57) ABSTRACT

Provided is a pneumatic tire having a sufficiently suppressed change in handling property and sufficiently improved durability. This pneumatic tire comprises a tread portion including a rubber layer, the rubber layer is formed of a rubber composition having 0.25 or less of a loss tangent (15° C. tan δ) measured under such conditions as 15° C., frequency 10 Hz, initial strain 5%, and dynamic strain rate 1%, the tread portion includes a plurality of rib-like land portions formed by circumferential grooves continuously extending in the circumferential direction, the tread portion has a ground contact surface partitioned, at the equatorial plane, such that one ground contact area Sa and the other ground contact area Sb satisfy a relationship of Sa>Sb, and (formula 1) and (formula 2) are satisfied where Wt (mm) is the cross sectional width of the tire, Dt (mm) is the outer diameter, and V (mm3) is a virtual volume being the volume of a space occupied by the tire when the tire is mounted on a standard rim and the internal pressure is 250 kPa.

$$1600 \leq (Dt^2 \times \pi/4)/Wt \leq 2827.4 \quad \text{(formula 1)}$$

$$[(V+1.5\times10^7)/Wt] \leq 2.88\times10^5 \quad \text{(formula 2)}$$

18 Claims, No Drawings

(56) References Cited

FOREIGN PATENT DOCUMENTS

| | | | | | |
|---|---|---|---|---|---|
| JP | 2018-167753 | A | | 11/2018 | |
| JP | 2018-178034 | A | | 11/2018 | |
| JP | 2019-89911 | A | | 6/2019 | |
| JP | 2019-208643 | A | | 12/2019 | |
| JP | 2019-209874 | A | | 12/2019 | |
| JP | 2020-63336 | A | | 4/2020 | |
| JP | 2020093681 | A | * | 6/2020 | |
| WO | WO-2017074459 | A1 | * | 5/2017 | ......... B60C 11/1281 |
| WO | WO 2018/186367 | A1 | | 10/2018 | |
| WO | WO 2019/159892 | A1 | | 8/2019 | |

OTHER PUBLICATIONS

Written Opinion of the International Searching Authority for PCT/JP2020/038096 mailed on Nov. 10, 2020.

Japanese Office Action for Japanese Application No. 2022-539992, dated Mar. 4, 2024, with a brief explanation.

English machine translation of JP 2016-141317-A, dated Aug. 8, 2016.

English machine translation of JP 2018-167753-A, dated Nov. 1, 2018.

English machine translation of JP 2020-63336-A, dated Apr. 23, 2020.

English machine translation of JP 57-147901-A, dated Sep. 13, 1982.

English machine translation of WO 2019/159892-A1, dated Aug. 22, 2019.

Extended European Search Report for European Application No. 20947751.2, dated Jul. 26, 2024.

English translation of the second Chinese Office Action for Chinese Application No. 2020801047244, dated Mar. 18, 2025.

* cited by examiner

PNEUMATIC TIRE

TECHNICAL FIELD

The present invention relates to a pneumatic tire.

BACKGROUND ART

In recent years, from the viewpoint of increasing interest in environmental issues and economic efficiency, there has been a growing demand for fuel efficiency in automobiles, and there is a strong demand for improved fuel efficiency also in pneumatic tires (hereinafter, simply referred to as "tires") installed in automobiles.

The fuel efficiency of a tire can be evaluated by rolling resistance, and it is known that the smaller the rolling resistance, the better the fuel efficiency of the tire.

Therefore, conventionally, it has been proposed to reduce the rolling resistance by devising the formulation of the rubber composition constituting the tread portion of the tire (for example, Patent Documents 1 to 4).

PRIOR ART DOCUMENTS

Patent Document

[Patent Document 1] JP2018-178034A
[Patent Document 2] JP2019-089911A
[Patent Document 3] WO2018/186367A
[Patent Document 4] JP2019-206643A

SUMMARY OF INVENTION

Problem to be Solved by the Invention

However, it cannot be said that the tire manufactured by the above-mentioned conventional technique has a small change in handling characteristics between low-speed running and high-speed running, and it is required to suppress the change in handling characteristics between low-speed running and high-speed running. And it cannot be said that these tires have sufficient durability.

Therefore, an object of the present invention is to provide a pneumatic tire in which a change in handling characteristics between low-speed running and high-speed running is sufficiently suppressed and its durability is sufficiently improved.

Means for Solving the Problem

The present inventor has diligently studied the solution to the above-mentioned problem, found that the above-mentioned problem can be solved by the invention described below, and has completed the present invention.

The invention according to a first embodiment is a pneumatic tire having a tread portion, wherein the rubber layer constituting the tread portion is formed by a rubber composition having a loss tangent (15° C. tan δ) of 0.25 or less measured under the conditions of 15° C., frequency 10 Hz, initial strain 5%, and dynamic strain rate 1%;

a plurality of rib-shaped land portions are formed by circumferential grooves extending continuously in the circumferential direction, in the tread portion;

when the grand contact surface of the tread portion is divided by the equatorial plane, and when one ground contact area is Sa and the other is Sb, Sa>Sb; and when the cross-sectional width of the tire is Wt (mm), the outer diameter is Dt (mm), and the volume of the space occupied by the tire is the virtual volume V ($mm^3$), when the tire is installed on a standardized rim and the internal pressure is 250 kPa, the tire satisfies following (formula 1) and (formula 2):

$$1600 \leq (Dt^2 \times \pi/4)/Wt \leq 2827.4 \quad \text{(formula 1)}$$

$$[(V+1.5\times10^7)/Wt] \leq 2.88\times10^5 \quad \text{(formula 2)}$$

The invention according to a second embodiment is the pneumatic tire according to a first embodiment, wherein the tire satisfies the following (formula 3).

$$[(V+2.0\times10^7)/Wt]{:}2.88\times10^5 \quad \text{(formula 3)}$$

The invention according to a third embodiment is the pneumatic tire according to a second embodiment, wherein the tire satisfies the following (formula 4).

$$[(V+2.5\times10^7)/Wt] \leq 2.88\times10^5 \quad \text{(formula 4)}$$

The invention according to a fourth embodiment is the pneumatic tire according to any one of embodiments one to three, wherein the 15° C. tan δ is 0.20 or less.

The invention according to a fifth embodiment is the pneumatic tire according to any one of embodiments one to four, wherein when the outer diameter of the tire is Dt (mm) and the cross-sectional height of the tire is Ht (mm), when the tire is installed on a standardized rim and the internal pressure is 250 kPa, (Dt−2×Ht) is 470 (mm) or more.

The invention according to a sixth embodiment is the pneumatic tire according to any one of embodiments one to five, wherein the aspect ratio is 40% or more.

The invention according to a seventh embodiment is the pneumatic tire according to a sixth embodiment, wherein the aspect ratio is 45% or more.

The invention according to an eighth embodiment is the pneumatic tire according to a seventh embodiment, wherein the aspect ratio is 47.5% or more.

The invention according to a ninth embodiment is the pneumatic tire according to any one of embodiments one to eight, wherein the tire satisfies 15° C. tan δ×Wt≤50.

The invention according to a tenth embodiment is the pneumatic tire according to a ninth embodiment, wherein the tire satisfies 15° C. tan δ×Wt≤40.

The invention according to an eleventh embodiment is the pneumatic tire according to a tenth embodiment, wherein the tire satisfies 15° C. tan δ×Wt 30.

The invention according to a twelfth embodiment is the pneumatic tire according to any one of embodiments one to eleven, wherein the tire satisfies Sb/Sa<0.8.

The invention according to a thirteenth embodiment is the pneumatic tire according to a twelfth embodiment, wherein the tire satisfies Sb/Sa<0.75.

The invention according to a fourteenth embodiment is the pneumatic tire according to a thirteenth embodiment, wherein the tire satisfies Sb/Sa<0.7.

The invention according to a fifteenth embodiment is the pneumatic tire according to any one of embodiments one to fourteen, wherein a plurality of circumferential grooves extending continuously in the tire circumferential direction are formed in the tread portion, and the total cross-sectional area of the plurality of circumferential grooves is 10 to 30% of the cross-sectional area of the tread portion.

The invention according to a sixteenth embodiment is the pneumatic tire according to any one of embodiments one to fifteen, wherein a plurality of lateral grooves extending in the tire axial direction are formed in the tread portion, and the total volume of the plurality of lateral grooves is 2.0 to 5.0% of the volume of the tread portion.

The invention according to a seventeenth embodiment is the pneumatic tire according to any one of embodiments one to sixteen, wherein when the outer diameter of the tire is Dt (mm) when the tire is installed on a standardized rim and the internal pressure is 250 kPa, the Dt is less than 685 (mm).

The invention according to an eighteenth embodiment is the pneumatic tire according to any one of embodiments one to seventeen, wherein the cross-sectional width Wt (mm) is less than 205 mm.

The invention according to a nineteenth embodiment is the pneumatic tire according to an eighteenth embodiment, wherein the cross-sectional width Wt (mm) is less than 200 mm.

THE EFFECT OF THE INVENTION

According to the present invention, it is possible to provide a pneumatic tire in which a change in handling characteristics between low-speed running and high-speed running is sufficiently suppressed and its durability is sufficiently improved.

EMBODIMENTS FOR CARRYING OUT THE INVENTION

[1] Features of the Tire of the Present Invention First, the features of the tire according to the present invention will be described.

1. Overview

The tire according to the present invention is first characterized by the rubber layer constituting the tread portion being formed by a rubber composition having a loss tangent (15° C. tan δ) of 0.25 or less measured under the conditions of 15° C., frequency 10 Hz, initial strain 5%, and dynamic strain rate 1%.

The tire according to the present invention has the following features when viewed from the viewpoint of shape.

That is, in the tread portion, a plurality of rib-shaped land portions are formed by the circumferential grooves extending continuously in the circumferential direction. Then, when one ground contact area is Sa and the other is Sb when the ground contact surface of the tread portion is divided by the equatorial plane, Sa>Sb.

Furthermore, when the cross-sectional width of the tire is Wt (mm), the outer diameter is Dt (mm), and the volume of the space occupied by the tire is the virtual volume V ($mm^3$), when the tire is installed on a standardized rim, the internal pressure is 250 kPa and the tire satisfies following (formula 1) and (formula 2):

$$1600 \leq (Dt^2 \times \pi/4)/Wt \leq 2827.4 \quad \text{(formula 1)}$$

$$[(V+1.5\times10^7)/Wt] \leq 2.88\times10^5 \quad \text{(formula 2)}$$

With the above-mentioned characteristics with respect to the physical properties of the rubber composition forming the tread portion and the shape of the tire, it is possible to provide a pneumatic tire wherein not only the rolling resistance is reduced, but also the change in handling characteristics between low-speed running and high-speed running is suppressed and the durability is sufficiently improved.

In the above description, the ground contact area is the actual ground contact area where the ground contact surface of the tire excluding grooves, sipes, and the like actually contacts the road surface over the entire circumference of the tire.

In the above description, the "standardized rim" is a rim defined for each tire in the standard system including the standard on which the tire is based. For example, in the case of JATMA (Japan Automobile Tire Association), it is the standard rim in applicable sizes described in the "JATMA YEAR BOOK", in the case of "ETRTO (The European Tire and Rim Technical Organization)", it is "Measuring Rim" described in "STANDARDS MANUAL", and in the case of TRA (The Tire and Rim Association, Inc.), it is "Design Rim" described in" YEAR BOOK". In the case of tires that are not specified in the standard, it refers a rim that can be assembled and can maintain internal pressure, that is, the rim that does not cause air leakage from between the rim and the tire, and has the smallest rim diameter, and then the narrowest rim width.

Further, the outer diameter Dt of the tire is the outer diameter of the tire installed on a standardized rim, having an internal pressure of 250 kPa and in a no-load state. The cross-sectional width Wt (mm) of the tire is the width of tire installed on a standardized rim, having an internal pressure of 250 kPa and in a no-load state, and excluding patterns, letters, and the like on the tire side from the linear distance between the sidewalls (total width of the tire) including all the patterns, letters and the like on the tire side.

Further, the virtual volume V ($mm^3$) of the tire is, specifically, can be calculated by the following formula:

$$V=[(Dt/2)^2-\{(Dt/2)-Ht\}^2]\times\pi\times Wt$$

based on the outer diameter of tire Dt (mm), the tire cross-sectional height (distance from the bottom of the bead to the outermost surface of the tread, ½ of the difference between the tire outer diameter and the nominal rim diameter) Ht (mm), and the tire cross-sectional width Wt (mm), in the state the tire is installed on a standardized rim, the internal pressure is 250 kPa and no load is applied.

2. Mechanism of Effect Manifestation in Tire According to the Present Invention The mechanism of effect manifestation in the tire according to the present invention, that is, the mechanism of not only the rolling resistance being reduced, but also the change in handling characteristics at low-speed running and high-speed running being sufficiently suppressed, and the durability being sufficiently improved, is presumed as follows.

(1) Tire Shape

As described above, in the present invention, the cross-sectional width Wt (mm) and the outer diameter Dt (mm) of the tire are tried to satisfy 1600≤($Dt^2$×π/4)/Wt≤2827.4 (formula 1).

By increasing the area [$(Dt/2)^2\times\pi$)=($Dt^2\times\pi/4$)] when the tire is viewed from the lateral direction, with respect to the cross-sectional width Wt of the tire, and satisfying the numerical range specified in formula 1, the repetition of deformation per unit time is reduced, as a result, the time available for heat exchange is extended to improve the heat release property of the side portion, and the friction between the tread portion and the road surface can be reduced, and, therefore, it is considered that low rolling resistance and improvement of durability can be achieved. In (formula 1), $(Dt^2 \times \pi/4)/Wt$ is more preferably 1700 or more, further preferably 1865 or more, further preferably 1963.5 or more, and even more preferably 2018 or more.

However, such a tire has a large area when viewed from the lateral direction, and, as the outer diameter Dt increases, the centrifugal force acting on the entire tread portion during high-speed running increases. As a result, partial non-uniformity is promoted, which may lead to non-uniform ground pressure in the ground area.

In particular, as the running speed is increased, the centrifugal force also increases accordingly, so that the handling characteristic may change significantly between low-speed running and high-speed running.

Therefore, in the present invention, the virtual volume V ($mm^3$) and the cross-sectional width Wt (mm) of the tire are tried to satisfy $[(V+1.5\times10^7)/Wt]\leq2.88\times10^5$ (formula 2).

In this way, it is considered that, by reducing the virtual volume V of the tire in accordance with the decrease in the cross-sectional width Wt of the tire, and reducing the volume of the tire itself, the growth of outer diameter with increasing centrifugal force can be suppressed with reduced rolling resistance, and the heat generation at high-speed running can be reduced to suppress the decrease in the rigidity of the tread.

At this time, it is more preferable that $[(V+2.0\times10^7)/Wt]\leq2.88\times10^5$ (formula 3), and $[(V+2.5\times10^7)/Wt]\leq2.88\times10^5$ (formula 4) is further preferable.

Further, in the present invention, a plurality of rib-shaped land portions are formed in the tread portion by the circumferential groove extending continuously in the circumferential direction, and when the ground contact surface of the tread portion is divided by the equatorial plane and the one area is Sa and the other is Sb, the tire is tried to satisfy Sa>Sb. In this way, by forming a plurality of rib-shaped land portions so that the contact area of the tread portion is non-uniform on the left and right sides of the equator, sudden non-uniformity of ground contact pressure can be suppressed even if the running speed is increased, and it is considered that the change in handling characteristics between low-speed running and high-speed running can be suppressed. The circumferential groove is a groove that extends continuously in the circumferential direction, and a non-linear groove such as a zigzag shape or a wavy shape is also included in the circumferential groove.

Here, the "rib-shaped land portion" is a land portion sandwiched by two circumferential grooves excluding a land portion (block-shaped land portion) which is separated by a lateral groove having the same depth as or deeper than the deeper circumferential groove. That is, it is a land portion which is sandwiched between two circumferential grooves and in which a lateral groove communicating with both the two circumferential grooves is not formed, or a land portion in which a lateral groove shallower than the deeper groove of the two circumferential grooves is formed, and the shallow lateral groove communicates with both the two circumferential grooves.

The Sb/Sa is preferably less than 0.8, more preferably less than 0.75, and even more preferably less than 0.7.

(2) Rubber Composition Forming a Tread Portion

In the present invention, the tread portion is formed by a rubber composition having a loss tangent (15° C. tan δ) of 0.25 or less measured under the conditions of 15° C., frequency 10 Hz, initial strain 5%, and dynamic strain rate 1%. In this way, by making 15° C. tan δ as small as 0.25 or less, the heat generation at the tread portion can be reduced and the temperature rise of the tire can be suppressed, so that the deterioration of durability of the rubber composition itself and the growth of the outer diameter due to the temperature rise is suppressed and it is possible to prevent damage to the tire, and improve durability. The 15° C. tan δ is more preferably 0.23 or less, further preferably 0.20 or less, and particularly preferably 0.18 or less.

Measurement of the above-mentioned 15° C. tan δ is performed on the rubber cut out from the radial outside of the groove bottom of the tire at least, preferably from the radial outside of the half depth of the deepest circumferential groove. Specifically, the measurement is performed using, for example, a viscoelasticity measuring device of "Eplexor (registered trademark)" manufactured by GABO.

[2] More Preferable Embodiment of the Tire According to the Present Invention.

The tire according to the present invention can obtain a larger effect by taking the following embodiment.

1. Aspect Ratio

The tire according to the present invention is preferably a tire having an aspect ratio of 40% or more, whereby the height of the side portion of the tire can be increased and the area of the side portion can be increased, so that the heat dissipation of the entire tire can be further enhanced, and the decrease in the rigidity of the tread and the side is suppressed. As a result, changes in handling characteristics can be sufficiently suppressed. In addition, the rolling resistance at high-speed running can be further reduced, and the durability of the tire can be further improved.

The aspect ratio (%) described above can be obtained by the following formula using the cross-sectional height Ht (mm) and the cross-sectional width Wt (mm) of the tire when the internal pressure is 250 kPa.

$$(Ht/Wt)\times100(\%)$$

The aspect ratio is more preferably 45% or more, and further preferably 47.5% or more. Further, it is further more preferably 50% or more, particularly preferably 52.5% or more, and most preferably 55% or more. There is no particular upper limit, but for example, it is 100% or less.

2. Relationship Between Loss Tangent (tan δ) and Cross-Sectional Width Wt (mm)

As the cross-sectional width Wt increases, the difference between the contact pressure of the tread center portion and the contact pressure of the tread shoulder portion tends to increase, and it is assumed that it becomes difficult to control the heat generation. The inventors considered that the heat generation can be controlled by reducing the tan δ as the cross-sectional width Wt increases, and investigated the relationship between the loss tangent at 15° C. (15° C. tan δ) and the cross-sectional width Wt (mm). As a result, if 15° C. tan δ×Wt≤50 is satisfied, the heat generation can be controlled according to the width, the rolling resistance at high-speed running can be further reduced, and the durability of the tire can be further improved.

It was found that satisfying 15° C. tan δ×Wt≤40 is more preferable, and satisfying 15° C. tan δ×Wt≤30 is even more preferable.

3. Tread Groove

In the tire according to the present invention, a circumferential groove continuously extending in the tire circumferential direction is formed in the tread portion, and the ratio of the groove width $L_{80}$ at a depth of 80% of the maximum depth of the circumferential groove to the groove width $L_{80}$ of the circumferential groove on the ground contact surface of the tread portion ($L_{80}/L_0$) is preferably 0.3 to 0.7. As a result, it is possible to suppress the movement of the entire land portion on the bottom surface of the land portion of the tread portion, and it is considered that the chipping of the tread portion can be suppressed and the durability can be improved. The ratio is more preferably 0.35 to 0.65, further preferably 0.40 to 0.60, and particularly preferably 0.45 to 0.55.

The above-mentioned $L_0$ and $L_{80}$ refer to the linear distance ($L_0$) between the groove edges on the tread surface of the tread circumferential groove of a tire, and to the minimum distance ($L_{80}$) between the groove walls at a position where the groove depth is 80%, respectively, in a state where the tire is installed on a standardized rim, the internal pressure is 250 kPa, and no load is applied. To put it simply, they can be obtained by putting the bead portion of the section cut out in the radial direction with a width of 2 to 4 cm in a pressed state according to the rim width.

It is preferable that a plurality of circumferential grooves are formed in the tread portion, and the total cross-sectional area of the plurality of circumferential grooves is 10 to 30% of the cross-sectional area of the tread portion. It is considered that this makes it possible to suppress the movement of the tread portion, suppress the chipping of the tread portion, and improve the durability. It is more preferably 15 to 27%, further preferably 18 to 25%, and particularly preferably 21 to 23%.

The cross-sectional area of the circumferential groove refers to the total value of the area composed of a straight line connecting the ends of the tread circumferential groove and a groove wall in a tire installed on a standardized rim, having an internal pressure of 250 kPa and in a no-load state. To put it simply, they can be obtained by putting the bead portion of the section cut out in the radial direction with a width of 2 to 4 cm in a pressed state according to the rim width.

Further, it is preferable that a plurality of lateral grooves extending in the tire axial direction are formed in the tread portion, and the total volume of the plurality of lateral grooves is 2.0 to 5.0% of the volume of the tread portion. It is considered that this makes it possible to suppress the movement of the tread portion, suppress the chipping of the tread portion, and improve the durability. It is more preferably 2.2 to 4.0%, further preferably 2.5 to 3.5%, and particularly preferably 2.7 to 3.0%.

The volume of the lateral groove described above refers to the total volume of the volume composed of the surface connecting the ends of the lateral groove and the groove wall in a tire installed on a standardized rim, having an internal pressure of 250 kPa and in a no-load state. To put it simply, it can be obtained by calculating the volume of each lateral groove and multiplying it by the number of grooves, in a state where the bead portion of the section cut out in the radial direction with a width of 2 to 4 cm is pressed down according to the rim width. Further, the volume of the tread portion can be calculated by calculating the area of the portion excluding the lateral groove from the section and multiplying it by the outer diameter, then obtaining the difference between the calculation result and the volume of the lateral groove.

In order to suppress chipping of the tread portion and further improve the durability, it is preferred that at least one of these lateral grooves has a groove width ratio (Gw/Gd), i.e. ratio of groove width Gw to groove depth Gd, of 0.50 to 0.80. The ratio is more preferably 0.53 to 0.77, further preferably 0.55 to 0.75, and particularly preferably 0.60 to 0.70.

The groove width and groove depth of the lateral groove described above refer to the maximum length of the straight lines connecting the tread surface ends of the lateral groove, which are perpendicular to the groove direction, and to the maximum depth of the lateral groove, respectively, in the tire in a state where the internal pressure is 250 kPa and no load is applied. To put it simply, it can be calculated in a state where the bead portion of the section cut out in the radial direction with a width of 2 to 4 cm is put down in a pressed state according to the rim width.

In the tire according to the present invention, when the tire is installed on a standardized rim and the internal pressure is 250 kPa, the specific outer diameter Dt (mm) is preferably 515 mm or more, more preferably 558 mm or more, further preferably 585 mm or more, particularly preferably 658 mm or more, and most preferably 673 mm or more. On the other hand, it is preferably less than 843 mm, more preferably less than 725 mm, further preferably less than 707 mm, particularly preferably less than 685 mm, and most preferably less than 655 mm.

The specific cross-sectional width Wt (mm) is preferably 115 mm or more, more preferably 130 mm or more, further preferably 150 mm or more, still more preferably 170 mm or more, and even more preferably 185 mm, and most preferably 193 mm or more. On the other hand, it is preferably less than 305 mm, more preferably less than 245 mm, further preferably less than 210 mm, particularly preferably less than 205 mm, and most preferably less than 200 mm.

The specific cross-sectional height Ht (mm) is preferably 37 mm or more, more preferably 87 mm or more, and further preferably 95 mm or more. On the other hand, it is preferably less than 180 mm, more preferably less than 112 mm, and even more preferably less than 101 mm.

The specific virtual volume V is preferably 13,000,000 $mm^3$ or more, more preferably 29,000,000 $mm^3$ or more, and even more preferably 36,000,000 $mm^3$ or more. On the other hand, it is preferably less than 66,000,000 $mm^3$, more preferably less than 44,000,000 $mm^3$, and even more preferably less than 38,800,000 $mm^3$.

Further, in the present invention, considering the stability of the riding comfort during traveling, $(Dt-2\times Ht)$ is preferably 450 (mm) or more, more preferably 470 (mm) or more, and further preferably 480 (mm) or more. On the other hand, considering the deformation of the tread portion, it is preferably less than 560 (mm), more preferably less than 530 (mm), and even more preferably less than 510 (mm).

EMBODIMENT

Hereinafter, the present invention will be specifically described based on the embodiments.

1. Rubber Composition Forming the Tread Portion

The rubber composition forming the tread portion of the tire according to the present invention can be obtained by appropriately adjusting the type and amount of various compounding materials such as rubber components, fillers, softeners, vulcanizing agents and vulcanization accelerators described below, in particular, filler and the softeners.

(1) Rubber Component

In the present embodiment, as the rubber component, rubber (polymer) generally used for producing tires such as butadiene rubber (BR), styrene-butadiene rubber (SBR), isoprene-based rubber, and nitrile rubber (NBR) is used. Among these, it is preferable to use butadiene rubber (BR), styrene butadiene rubber (SBR), and isoprene-based rubber. Since these rubbers can be entangled with each other with phase separation of each of the rubber phases, distortion inside the rubber can be reduced.

(a) BR

The content of BR in 100 parts by mass of the rubber component is 1 part by mass or more and less than 100 parts by mass. Of these, more than 25 parts by mass is preferable, more than 35 parts by mass is more preferable, and more than 45 parts by mass is particularly preferable. Further, less than 85 parts by mass is preferable, less than 75 parts by mass is more preferable, less than 65 parts by mass is further preferable, and less than 55 parts by mass is particularly preferable. The weight average molecular weight of BR is, for example, more than 100,000 and less than 2 million. The vinyl bond amount of BR is, for example, more than 1% by mass and less than 30% by mass. The cis content of BR is, for example, more than 1% by mass and less than 98% by mass. The trans content of BR is, for example, more than 1% by mass and less than 60% by mass. The cis content of BR can be measured by infrared absorption spectrum analysis.

The BR is not particularly limited, and BR having a high cis content (cis content of 90% or more), BR having a low cis content, BR containing syndiotactic polybutadiene crystals, and the like can be used. The BR may be either a non-modified BR or a modified BR, and as the modified BR, for example, a BR modified with a compound (modifying agent) represented by the following formula can be used.

[Chemical 1]

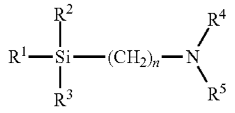

In the formula, R1, R2 and R3 represent, the same or different, alkyl group, alkoxy group, silyloxy group, acetal group, carboxyl group (—COOH), mercapto group (—SH) or derivatives thereof. R4 and R5 represent, the same or different, hydrogen atoms or alkyl groups. R4 and R5 may be combined to form a ring structure with nitrogen atoms. n represents an integer.

As the modified BR modified by the compound represented by the above formula (modifying agent), BR in which the polymerization end (active end) is modified by the compound represented by the above formula can be used.

As R1, R2 and R3, an alkoxy group is suitable (preferably an alkoxy group having 1 to 8 carbon atoms, more preferably an alkoxy group having 1 to 4 carbon atoms). As R4 and R5, an alkyl group (preferably an alkyl group having 1 to 3 carbon atoms) is suitable. n is preferably 1 to 5, more preferably 2 to 4, and even more preferably 3. Further, when R4 and R5 are bonded to form a ring structure together with a nitrogen atom, a 4- to 8-membered ring is preferable. The alkoxy group also includes a cycloalkoxy group (for example, cyclohexyloxy group) and an aryloxy group (for example, phenoxy group, benzyloxy group).

Specific examples of the above modifying agent include 2-dimethylaminoethyltrimethoxysilane, 3-dimethylaminopropyltrimethoxysilane, 2-dimethylaminoethyltriethoxysilane, 3-dimethylaminopropyltriethoxysilane, 2-diethylaminoethyltrimethoxysilane, 3-diethylaminopropyltrimethoxysilane, 2-diethylaminoethyltriethoxysilane, and 3-diethylaminopropyltriethoxysilane. These may be used alone or in combination of two or more.

Further, as the modified BR, a modified BR modified with the following compound (modifying agent) can also be used. Examples of the modifying agent include

- polyglycidyl ethers of polyhydric alcohols such as ethylene glycol diglycidyl ether, glycerin triglycidyl ether, trimethylolethanetriglycidyl ether, and trimethylolpropane triglycidyl ether;
- polyglycidyl ethers of aromatic compounds having two or more phenol groups such as diglycidylated bisphenol A; polyepoxy compounds such as 1,4-diglycidylbenzene, 1,3,5-triglycidylbenzene, and polyepoxidized liquid polybutadiene;
- epoxy group-containing tertiary amines such as 4,4'-diglycidyl-diphenylmethylamine, and 4,4'-diglycidyl-dibenzylmethylamine;
- diglycidylamino compounds such as diglycidylaniline, N, N'-diglycidyl-4-glycidyloxyaniline, diglycidyl orthotoluidine, tetraglycidylmetaxylenidiamine, tetraglycidylaminodiphenylmethane, tetraglycidyl-p-phenylenediamine, diglycidylaminomethylcyclohexane, and tetraglycidyl-1,3-bisaminomethylcyclohexane;
- amino group-containing acid chlorides such as bis-(1-methylpropyl) carbamate chloride, 4-morpholincarbonyl chloride, 1-pyrrolidincarbonyl chloride, N, N-dimethylcarbamide acid chloride, and N, N-diethylcarbamide acid chloride;
- epoxy group-containing silane compounds such as 1,3-bis-(glycidyloxypropyl)-tetramethyldisiloxane, and (3-glycidyloxypropyl)-pentamethyldisiloxane;
- sulfide group-containing silane compound such as (trimethylsilyl) [3-(trimethoxysilyl) propyl]sulfide, (trimethylsilyl) [3-(triethoxysilyl) propyl]sulfide, (trimethylsilyl) [3-(tripropoxysilyl) propyl]sulfide, (trimethylsilyl) [3-(tributoxysilyl) propyl]sulfide, (trimethylsilyl) [3-(methyldimethoxysilyl) propyl]sulfide, (trimethylsilyl) [3-(methyldiethoxysilyl) propyl] sulfide, (trimethylsilyl) [3-(methyldipropoxysilyl) propyl]sulfide, and (trimethylsilyl) [3-(methyldibutoxysilyl) propyl]sulfide;
- N-substituted aziridine compound such as ethyleneimine and propyleneimine;
- alkoxysilanes such as methyltriethoxysilane, N, N-bis (trimethylsilyl)-3-aminopropyltrimethoxysilane, N, N-bis(trimethylsilyl)-3-aminopropyltriethoxysilane, N, N-bis(trimethylsilyl) aminoethyltrimethoxysilane, and N, N-bis(trimethylsilyl) aminoethyltriethoxysilane;
- (thio) benzophenone compound having an amino group and/or a substituted amino group such as 4-N, N-dimethylaminobenzophenone, 4-N, N-di-t-butylaminobenzophenone, 4-N, N-diphenylamino benzophenone, 4,4'-bis(dimethylamino) benzophenone, 4,4'-bis(diethylamino) benzophenone, 4,4'-bis(diphenylamino) benzophenone, and N, N, N', N'-bis-(tetraethylamino) benzophenone;
- benzaldehyde compounds having an amino group and/or a substituted amino group such as 4-N, N-dimethylaminobenzaldehyde, 4-N, N-diphenylaminobenzaldehyde, and 4-N, N-divinylamino benzaldehyde;
- N-substituted pyroridone such as N-methyl-2-pyrrolidone, N-vinyl-2-pyrrolidone, N-phenyl-2-pyrrolidone, N-t-butyl-2-pyrrolidone, and N-methyl-5-methyl-2-pyrrolidone;
- N-substituted piperidone such as methyl-2-piperidone, N-vinyl-2-piperidone, and N-phenyl-2-piperidone;
- N-substituted lactams such as N-methyl-ε-caprolactam, N-phenyl-ε-caprolactum, N-methyl-ω-laurilolactum, N-vinyl-ω-laurilolactum, N-methyl-β-propiolactam, and N-phenyl-β-propiolactam; and
- N, N-bis-(2,3-epoxypropoxy)-aniline, 4,4-methylene-bis-(N, N-glyc idylaniline), tris-(2,3-epoxypropyl)-1,3,5- triazine-2,4,6-triones, N, N-diethyl acetamide, N-methylmaleimide, N, N-diethylurea, 1,3-dimethylethylene urea, 1,3-divinylethyleneurea, 1,3-diethyl-2-imidazolidinone, 1-methyl-3-ethyl-2-imidazolidinone, 4-N, N-dimethylaminoacetophenone, 4-N, N-diethylami noacetophenone, 1,3-bis(diphenylamino)-2-propanone, and 1,7-bis(methyl ethylamino)-4-heptanone. The modification with the above compound (modifying agent) can be carried out by a known method. These modified BRs may be used alone or in combination of two or more.

As the BR, for example, products of Ube Kosan Co., Ltd., JSR Corporation, Asahi Kasei Co., Ltd., and Nippon Zeon Co., Ltd., etc. can be used.

(b) SBR

The content of SBR in 100 parts by mass of the rubber component is 1 part by mass or more and less than 100 parts by mass. Of these, more than 5 parts by mass is preferable, more than 15 parts by mass is more preferable, and more than 25 parts by mass is particularly preferable. Further, less than 65 parts by mass is preferable, less than 55 parts by mass is more preferable, less than 45 parts by mass is further preferable, and less than 35 parts by mass is particularly preferable.

The weight average molecular weight of SBR is, for example, more than 100,000 and less than 2 million. The styrene content of SBR is 5% by mass or more, particularly 8% by mass or more. Further, less than 35% by mass is preferable, less than 25% by mass is more preferable, and less than 15% by mass is further preferable. The vinyl bond amount (1,2-bonded butadiene unit amount) of SBR is, for example, more than 5% by mass and less than 70% by mass. In general, the lower the styrene content and the lower the vinyl bond amount, the lower the glass transition temperature Tg of the rubber composition. Therefore, it is preferable that the rubber composition has a low styrene content and a low vinyl bond amount. The structure identification of SBR (measurement of styrene content and vinyl bond amount) can be performed using, for example, an apparatus of the JNM-ECA series manufactured by JEOL Ltd.

The SBR is not particularly limited, and for example, emulsion-polymerized styrene-butadiene rubber (E-SBR), solution-polymerized styrene-butadiene rubber (S-SBR) and the like can be used. The SBR may be either a non-modified SBR or a modified SBR.

The modified SBR may be any SBR having a functional group that interacts with a filler such as silica. Examples thereof include

- end-modified SBR (end-modified SBR having the above functional group at the terminal) in which at least one end of the SBR is modified with a compound having the above functional group (modifying agent),
- main chain modified SBR having the functional group in the main chain,
- main chain terminal modified SBR having the functional group at the main chain and the terminal (for example, a main chain terminal modified SBR having the above functional group to the main chain and having at least one end modified with the above modifying agent), and
- end-modified SBR which is modified (coupled) with a polyfunctional compound having two or more epoxy groups in the molecule, and into which an epoxy group or hydroxyl group has been introduced,
- Examples of the functional group include an amino group, an amide group, a silyl group, an alkoxysilyl group, an isocyanate group, an imino group, an imidazole group, a urea group, an ether group, a carbonyl group, an oxycarbonyl group, a mercapto group, a sulfide group, a disulfide group, a sulfonyl group, a sulfinyl group, a thiocarbonyl group, an ammonium group, an imide group, a hydrazo group, an azo group, a diazo group, a carboxyl group, a nitrile group, a pyridyl group, an alkoxy group, a hydroxyl group, an oxy group, and an epoxy group. In addition, these functional groups may have a substituent.

Further, as the modified SBR, for example, an SBR modified with a compound (modifying agent) represented by the above-mentioned formula can be used.

As the SBR, for example, SBR manufactured and sold by Sumitomo Chemical Co., Ltd., JSR Corporation, Asahi Kasei Co., Ltd., Zeon Corporation, etc. can be used. The SBR may be used alone or in combination of two or more.

(c) Isoprene Rubber

The content (total content) of the isoprene-based rubber in 100 parts by mass of the rubber component is 1 part by mass or more and less than 100 parts by mass. Of these, more than 5 parts by mass is preferable, and more than 15 parts by mass is more preferable. Further, less than 55 parts by mass is preferable, less than 45 parts by mass is more preferable, less than 35 parts by mass is further preferable, and less than 25 parts by mass is particularly preferable. Examples of the isoprene-based rubber include natural rubber (NR), isoprene rubber (IR), reformed NR, modified NR, and modified IR.

As the NR, for example, SIR20, RSS #3, TSR20 and the like, which are common in the tire industry, can be used. The IR is not particularly limited, and for example, IR 2200 and the like, which are common in the tire industry, can be used. Reformed NR includes deproteinized natural rubber (DPNR), high-purity natural rubber (UPNR), and the like. Modified NR includes epoxidized natural rubber (ENR), hydrogenated natural rubber (HNR), grafted natural rubber, and the like. Modified IR includes epoxidized isoprene rubber, hydrogenated isoprene rubber, grafted isoprene rubber, and the like. These may be used alone or in combination of two or more.

(d) Other Rubber Components

Further, as another rubber component, rubber (polymer) generally used in the production of tires such as nitrile rubber (NBR) may be contained.

(2) Compounding Materials Other than Rubber Components (a) Filler

In the present embodiment, the rubber composition preferably contains a filler. Specific examples of the filler include silica, carbon black, calcium carbonate, tale, alumina, clay, aluminum hydroxide, and mica. Among these, silica and carbon black can be preferably used as the reinforcing agent. When silica is used, it is preferable to use it in combination with a silane coupling agent.

(a-1) Silica

The rubber composition preferably contains linsee. The BET specific surface area of the silica is preferably more than 140 $m^2/g$, more preferably more than 160 $m^2/g$, from the viewpoint of obtaining good durability performance. On the other hand, from the viewpoint of obtaining good rolling resistance at high-speed running, it is preferably less than 250 $m^2/g$, and more preferably less than 220 $m^2/g$. The above-mentioned BET specific surface area is the value of $N_2SA$ measured by the BET method according to ASTM D3037-93.

When silica is used as the filling reinforcing agent, the content of silica with respect to 100 parts by mass of the rubber component is preferably more than 60 parts by mass, more preferably more than 70 parts by mass, from the viewpoint of obtaining good durability performance. On the other hand, 200 parts by mass or less is preferable, 150 parts by mass or less is more preferable, and 130 parts by mass or less is further preferable.

Examples of silica include dry silica (anhydrous silica) and wet silica (hydrous silica). Among them, wet silica is preferable because it has large number of silanol groups.

As the silica, for example, products of Degussa, Rhodia, Tosoh Silica Co., Ltd., Solvay Japan Co., Ltd., Tokuyama Corporation, etc. can be used.

(a-2) Silane Coupling Agent

The rubber composition preferably contains a silane coupling agent together with silica. The silane coupling agent is not particularly limited. Examples of the silane coupling agent include

- sulfide-based ones such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl) tetrasulfide, bis(2-trimethoxysilylethyl) tetrasulfide, bis(2-triethoxysilylethyl)trisulfide, bis(4-trimethoxysilylbutyl) trisulfide, bis(3-triethoxysilylpropyl)disulfide, bis(2-triethoxysilylethyl) disulfide, bis(4-triethoxysilylbutyl)disulfide, bis(3-trimethoxysilylpropyl) disulfide, bis(2-trimethoxysilylethyl)disulfide, bis(4-trimethoxysilylbutyl)disulfide, 3-trimethoxysilylpropyl-N, N-dimethylthiocarbamoyltetrasulfide, 2-triethoxysilylethyl-N, N-dimethylthiocarbamoyltetrasulfide, and 3-triethoxysilylpropylmethacrylate-monosulfide;
- mercapto-based ones such as 3-mercaptopropyltrimethoxysilane, 2-mercaptoethyltriethoxysilane, and NXT and NXT-Z manufactured by Momentive;
- vinyl-based ones such as vinyl triethoxysilane, and vinyl trimethoxysilane;
- amino-based ones such as 3-aminopropyltriethoxysilane and 3-aminopropyltrimethoxysilane;
- glycidoxy-based ones such as γ-glycidoxypropyltriethoxysilane and γ-glycidoxypropyltrimethoxysilane;
- nitro-based ones such as 3-nitropropyltrimethoxysilane, and 3-nitropropyltriethoxysilane; and
- chloro-based ones such as 3-chloropropyltrimethoxysilane, and 3-chloropropyltriethoxysilane. These may be used alone or in combination of two or more.

As the silane coupling agent, for example, products of Degussa, Momentive, Shinetsu Silicone Co., Ltd., Tokyo Chemical Industry Co., Ltd., Azumax Co., Ltd., Toray Dow Corning Co., Ltd., etc. can be used.

The content of the silane coupling agent is, for example, more than 3 parts by mass and less than 25 parts by mass with respect to 100 parts by mass of silica.

(a-3) Carbon Black

The rubber composition preferably contains carbon black. The content of carbon black is, for example, more than 1 part by mass and less than 200 parts by mass with respect to 100 parts by mass of the rubber component.

The carbon black is not particularly limited, and examples thereof includes furnace black (furnace carbon black) such as SAF, ISAF, HAF, MAF, FEF, SRF, GPF, APF, FF, CF, SCF and ECF; acetylene black (acetylene carbon black); thermal black (thermal carbon black) such as FT and MT; channel black (channel carbon black) such as EPC, MPC and CC; and graphite. These may be used alone or in combination of two or more.

Nitrogen adsorption specific surface area ($N_2SA$) of carbon black is, for example, more than 30 $m^2/g$ and less than 250 $m^2/g$. The amount of dibutyl phthalate (DBP) absorbed by carbon black is, for example, more than 50 ml/100 g and less than 250 ml/100 g. The nitrogen adsorption specific surface area of carbon black is measured according to ASTM D4820-93, and the amount of DBP absorbed is measured according to ASTM D2414-93.

The specific carbon black is not particularly limited, and examples thereof include N134, N110, N220, N234, N219, N339, N330, N326, N351, N550, and N762. Commercially available products include, for example, products of Asahi Carbon Co., Ltd., Cabot Japan Co., Ltd., Tokai Carbon Co., Ltd., Mitsubishi Chemical Corporation, Lion Corporation, Shin Nikka Carbon Co., Ltd., Columbia Carbon Co., Ltd., etc. These may be used alone or in combination of two or more.

(a-4) Other Fillers

The rubber composition may further contain fillers such as calcium carbonate, talc, alumina, clay, aluminum hydroxide, and mica, which are generally used in the tire industry, in addition to the above-mentioned carbon black and silica. These contents are, for example, more than 0.1 part by mass and less than 200 parts by mass with respect to 100 parts by mass of the rubber component.

(b) Softener

The rubber composition may contain oil (including extender oil), liquid rubber, or the like, as a softener. The total content of these is preferably more than 5 parts by mass, more preferably more than 10 parts by mass with respect to 100 parts by mass of the rubber component. On the other hand, less than 70 parts by mass is preferable, less than 50 parts by mass is more preferable, and less than 30 parts by mass is further preferable. The oil content also includes the amount of oil contained in rubber (oil spread rubber).

Examples of the oil include mineral oil (generally referred to as process oil), vegetable oil and fat, or a mixture thereof. As the mineral oil (process oil), for example, a paraffinic process oil, an aroma-based process oil, a naphthene process oil, or the like can be used. Examples of the vegetable oils and fats include castor oil, cottonseed oil, linseed oil, rapeseed oil, soybean oil, palm oil, coconut oil, peanut oil, rosin, pine oil, pine tar, tall oil, corn oil, rice oil, beni flower oil, sesame oil, olive oil, sunflower oil, palm kernel oil, camellia oil, jojoba oil, macadamia nut oil, and tung oil. These may be used alone or in combination of two or more.

Specific examples of process oil (mineral oil) include products of Idemitsu Kosan Co., Ltd., Sankyo Yuka Kogyo Co., Ltd., Japan Energy Co., Ltd., Olisoy Co., Ltd., H & R Co., Ltd., Toyokuni Seiyu Co., Ltd., Showa Shell Sekiyu Co., Ltd., and Fuji Kosan Co., Ltd.

The liquid rubber mentioned as the softener is a polymer in a liquid state at room temperature (25° C.) and is a polymer having a monomer similar to that of solid rubber as a constituent element. Examples of the liquid rubber include farnesene-based polymers, liquid diene-based polymers, and hydrogenated additives thereof.

The farnesene-based polymer is a polymer obtained by polymerizing farnesene, and has a structural unit based on farnesene. Farnesene includes isomers such as α-farnesene ((3E, 7E) -3,7,11-trimethyl-1,3,6,10-dodecatetraene) and β-farnesene (7,11-dimethyl-3-methylene-1, 6,10-dodecatorien).

The farnesene-based polymer may be a homopolymer of farnesene (farnesene homopolymer) or a copolymer of farnesene and a vinyl monomer (farnesene-vinyl monomer copolymer).

Examples of the liquid diene polymer include a liquid styrene-butadiene copolymer (liquid SBR), a liquid butadiene polymer (liquid BR), a liquid isoprene polymer (liquid IR), and a liquid styrene isoprene copolymer (liquid SIR).

The liquid diene polymer has a polystyrene-equivalent weight average molecular weight (Mw) measured by gel permeation chromatography (GPC) of, for example, more than $1.0\times10^3$ and less than $2.0\times10^5$. In the present specification, Mw of the liquid diene polymer is a polystyrene conversion value measured by gel permeation chromatography (GPC).

The content of the liquid rubber (total content of the liquid farnesene-based polymer, the liquid diene-based polymer, etc.) is, for example, more than 1 part by mass and less than 100 parts by mass with respect to 100 parts by mass of the rubber component.

As the liquid rubber, for example, products of Kuraray Co., Ltd. and Clay Valley Co., Ltd. can be used.

(c) Resin Component

Further, the rubber composition preferably contains a resin component, if necessary. The resin component may be solid or liquid at room temperature, and specific resin components include styrene resin, coumarone resin, terpene resin, C5 resin, C9 resin, C5C9 resin, and acrylic resin. Two or more kinds of the resin component may be used in combination. The content of the resin component is preferably more than 2 parts by mass and less than 45 parts by mass, and more preferably less than 30 parts by mass, with respect to 100 parts by mass of the rubber component.

The styrene resin is a polymer using a styrene monomer as a constituent monomer, and examples thereof include a polymer obtained by polymerizing a styrene monomer as a main component (50% by mass or more). Specifically, it includes homopolymers obtained by individually polymerizing styrene monomers (styrene, o-methylstyrene, m-methylstyrene, p-methylstyrene, α-methylstyrene, p-methoxystyrene, p-tert-butylstyrene, p-phenylstyrene, o-chlorostyrene, m-chlorostyrene, p-chlorostyrene, etc.), copolymers obtained by copolymerizing two or more styrene monomers, and, in addition, copolymers obtained by copolymerizing a styrene monomer and other monomers that can be copolymerized with the styrene monomer.

Examples of the other monomers include acrylonitriles such as acrylonitrile and methacrylate; unsaturated carboxylic acids such as acrylic acid and methacrylic acid; unsaturated carboxylic acid esters such as methyl acrylate and methyl methacrylate; dienes such as chloroprene, butadiene, and isoprene, olefins such as 1-butene and 1-pentene; α, β-unsaturated carboxylic acids such as maleic anhydride and acid anhydrides thereof.

As the coumarone-based resin, coumarone-indene resin is preferably used. Coumarone-indene resin is a resin containing coumarone and indene as monomer components constituting the skeleton (main chain) of the resin. Examples of the monomer component contained in the skeleton other than coumarone and indene include styrene, α-methylstyrene, methylindene, and vinyltoluene.

The content of the coumarone-indene resin is, for example, more than 1.0 part by mass and less than 50.0 parts by mass with respect to 100 parts by mass of the rubber component.

The hydroxyl value (OH value) of the coumarone-indene resin is, for example, more than 15 mgKOH/g and less than 150 mgKOH/g. The OH value is the amount of potassium hydroxide required to neutralize acetic acid bonded to a hydroxyl group when 1 g of the resin is acetylated, and is expressed in milligrams. It is a value measured by potentiometric titration method (JIS K 0070: 1992).

The softening point of the coumarone-indene resin is, for example, higher than 30° C. and lower than 160° C. The softening point is the temperature at which the ball drops when the softening point defined in JIS K 6220-1: 2001 is measured by a ring-ball type softening point measuring device.

Examples of the terpene resins include polyterpenes, terpene phenols, and aromatic-modified terpene resins. Polyterpene is a resin obtained by polymerizing a terpene compound and a hydrogenated product thereof. The terpene compound is a hydrocarbon having a composition of $(C_5H_8)_n$ or an oxygen-containing derivative thereof, which is a compound having a terpene classified as monoterpenes ($C_{10}H_{16}$), sesquiterpenes ($C_{15}H_{24}$), diterpenes ($C_{20}H_{32}$), etc. as the basic skeleton. Examples thereof include α-pinene, β-pinene, dipentene, limonene, myrcene, alloocimene, osimene, α-phellandrene, α-terpinene, γ-terpinene, terpinolene, 1,8-cineol, 1,4-cineol, α-terpineol, β-terpineol, and γ-terpineol.

Examples of the polyterpene include terpene resins such as α-pinene resin, β-pinene resin, limonene resin, dipentene resin, and β-pinene/limonene resin, which are made from the above-mentioned terpene compound, as well as hydrogenated terpene resin obtained by hydrogenating the terpene resin. Examples of the terpene phenol include a resin obtained by copolymerizing the above-mentioned terpene compound and the phenol compound, and a resin obtained by hydrogenating above-mentioned resin. Specifically, a resin obtained by condensing the above-mentioned terpene compound, the phenol compound and the formalin is mentioned. Examples of the phenol compound include phenol, bisphenol A, cresol, and xylenol. Examples of the aromatic-modified terpene resin include a resin obtained by modifying a terpene resin with an aromatic compound, and a resin obtained by hydrogenating above-mentioned resin. The aromatic compound is not particularly limited as long as it is a compound having an aromatic ring, and examples thereof include phenol compounds such as phenol, alkylphenol, alkoxyphenol, and unsaturated hydrocarbon group-containing phenol; naphthol compounds such as naphthol, alkylnaphthol, alkoxynaphthol, and unsaturated hydrocarbon group-containing naphthols; styrene derivatives such as styrene, alkylstyrene, alkoxystyrene, unsaturated hydrocarbon group-containing styrene; coumarone, and indene.

The C5 resin refers to a resin obtained by polymerizing a C5 fraction. Examples of the C5 fraction include petroleum fractions having 4 to 5 carbon atoms such as cyclopentadiene, pentene, pentadiene, and isoprene. As the C5-based petroleum resin, a dicyclopentadiene resin (DCPD resin) is preferably used.

The C9 resin refers to a resin obtained by polymerizing a C9 fraction, and may be hydrogenated or modified. Examples of the C9 fraction include petroleum fractions having 8 to 10 carbon atoms such as vinyltoluene, alkylstyrene, indene, and methyl indene. As the specific examples, a coumarone-indene resin, a coumarone resin, an indene resin, and an aromatic vinyl resin are preferably used. As the aromatic vinyl resin, a homopolymer of α-methylstyrene or styrene or a copolymer of α-methylstyrene and styrene is preferable because it is economical, easy to process, and excellent in heat generation. A copolymer of α-methylstyrene and styrene is more preferred. As the aromatic vinyl-based resin, for example, those commercially available from Clayton, Eastman Chemical, etc. can be used.

The C5C9 resin refers to a resin obtained by copolymerizing the C5 fraction and the C9 fraction, and may be hydrogenated or modified. Examples of the C5 fraction and the C9 fraction include the above-mentioned petroleum fraction. As the C5C9 resin, for example, those commercially available from Tosoh Corporation, LUHUA, etc. can be used.

The acrylic resin is not particularly limited, but for example, a solvent-free acrylic resin can be used.

As the solvent-free acrylic resin, a (meth) acrylic resin (polymer) synthesized by a high-temperature continuous polymerization method (high-temperature continuous lump polymerization method: a method described in U.S. Pat. No. 4,414,370, JP 84-6207 A, JP 93-58805 A, JP 89-313522 A, U.S. Pat. No. 5,010,166, Toa Synthetic Research Annual Report TREND2000 No. 3 p42-45, and the like) without using polymerization initiators, chain transfer agents, organic solvents, etc. as auxiliary raw materials as much as possible, can be mentioned. In the present invention, (meth) acrylic means methacrylic and acrylic.

Examples of the monomer component constituting the acrylic resin include (meth) acrylic acid, and (meth) acrylic acid derivatives such as (meth) acrylic acid ester (alkyl ester, aryl ester, aralkyl ester, etc.), (meth) acrylamide, and (meth) acrylamide derivative.

In addition, as the monomer component constituting the acrylic resin, aromatic vinyl compounds such as styrene, α-methylstyrene, vinyltoluene, vinylnaphthalene, divinylbenzene, trivinylbenzene, divinylnaphthalene, and the like may be used, together with (meth) acrylic acid or (meth) acrylic acid derivative.

The acrylic resin may be a resin composed of only a (meth) acrylic component or a resin also having a component other than the (meth) acrylic component. Further, the acrylic resin may have a hydroxyl group, a carboxyl group, a silanol group, or the like.

As the resin component, for example, a product of Maruzen Petrochemical Co., Ltd.; Sumitomo Bakelite Co., Ltd., Yasuhara Chemical Co., Ltd., Toso Co., Ltd., Rutgers Chemicals Co., Ltd., BASF Co., Ltd., Arizona Chemical Co., Ltd., Nitto Chemical Co., Ltd., Co., Ltd., Nippon Catalyst Co., Ltd., JX Energy Co., Ltd., Arakawa Chemical Industry Co., Ltd., Taoka Chemical Industry Co., Ltd. can be used.

(d) Anti-Aging Agent

The rubber composition preferably contains an anti-aging agent. Content of the anti-aging agent is, for example, more than 1 part by mass and less than 10 parts by mass with respect to 100 parts by mass of the rubber component.

Examples of the antiaging agent include naphthylamine-based antiaging agents such as phenyl-α-naphthylamine; diphenylamine-based antiaging agents such as octylated diphenylamine and 4,4'-bis (α, α'-dimethylbenzyl) diphenylamine; p-phenylenediamine-based anti-aging agent such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline-based anti-aging agent such as a polymer of 2,2,4-trimethyl-1,2-dihydroquinolin; monophenolic anti-aging agents such as 2,6-di-t-butyl-4-methylphenol, styrenated phenol; bis, tris, polyphenolic anti-aging agents such as tetrakis-[methylene-3-(3',5'-di-t-butyl-4'-hydroxyphenyl)propionate]methane. These may be used alone or in combination of two or more.

As the anti-aging agent, for example, products of Seiko Chemical Co., Ltd., Sumitomo Chemical Co., Ltd., Ouchi Shinko Chemical Industry Co., Ltd., Flexsys Co., Ltd., etc. can be used.

(e) Stearic Acid

The rubber composition may contain stearic acid. Content of stearic acid is, for example, more than 0.5 parts by mass and less than 10.0 parts by mass with respect to 100 parts by mass of the rubber component. As the stearic acid, conventionally known ones can be used, and, for example, products of NOF Corporation, NOF Corporation, Kao Corporation, Fuji film Wako Pure Chemical Industries, Ltd., and Chiba Fatty Acid Co., Ltd., etc. can be used.

(f) Zinc Oxide

The rubber composition may contain zinc oxide. Content of zinc oxide is, for example, more than 0.5 parts by mass and less than 10 parts by mass with respect to 100 parts by mass of the rubber component. As the zinc oxide, conventionally known ones can be used, for example, products of Mitsui Metal Mining Co., Ltd., Toho Zinc Co., Ltd., Hakusui Tech Co., Ltd., Shodo Chemical Industry Co., Ltd., Sakai Chemical Industry Co., Ltd., etc. can be used.

(g) Wax

The rubber composition preferably contains wax. Content of the wax is, for example, 0.5 to 20 parts by mass, preferably 1.5 to 15 parts by mass, and more preferably 3.0 to 10.0 parts by mass with respect to 100 parts by mass of the rubber component.

The wax is not particularly limited, and examples thereof include petroleum waxes such as paraffin wax and microcrystalline wax; natural waxes such as plant wax and animal wax; and synthetic waxes such as a polymer such as ethylene and propylene. These may be used alone or in combination of two or more.

As the wax, for example, products of Ouchi Shinko Chemical Industry Co., Ltd., Nippon Seiro Co., Ltd., and Seiko Kagaku Co., Ltd. can be used.

(h) Crosslinking Agent and Vulcanization Accelerator

The rubber composition preferably contains a cross-linking agent such as sulfur. Content of the cross-linking agent is, for example, more than 0.1 part by mass and less than 10.0 parts by mass with respect to 100 parts by mass of the rubber component.

Examples of sulfur include powdered sulfur, precipitated sulfur, colloidal sulfur, insoluble sulfur, highly dispersible sulfur, and soluble sulfur, which are commonly used in the rubber industry. These may be used alone or in combination of two or more.

As the sulfur, for example, products of Tsurumi Chemical Industry Co., Ltd., Karuizawa Sulfur Co., Ltd., Shikoku Chemicals Corporation, Flexsys Co., Ltd., Nippon Kanryu Kogyo Co., Ltd., Hosoi Chemical Industry Co., Ltd., etc. can be used.

Examples of the cross-linking agent other than sulfur include vulcanizing agents containing a sulfur atom such as Tackirol V200 manufactured by Taoka Chemical Industry Co., Ltd., DURALINK HTS (1,6-hexamethylene-sodium dithiosulfate dihydrate) manufactured by Flexsys, and KA9188 (1,6-bis (N, N'-dibenzylthiocarbamoyldithio) hexane) manufactured by Lanxess; and organic peroxides such as dicumyl peroxide.

The rubber composition preferably contains a vulcanization accelerator. Content of the vulcanization accelerator is, for example, more than 0.3 parts by mass and less than 10.0 parts by mass with respect to 100 parts by mass of the rubber component.

Examples of the vulcanization accelerator include thiazole-based vulcanization accelerators such as 2-mercaptobenzothiazole, di-2-benzothiazolyl disulfide, and N-cyclohexyl-2-benzothiadylsulfenamide;

thiuram-based vulcanization accelerators such as tetramethylthiuram disulfide (TMTD), tetrabenzyltiuram disulfide (TBzTD), and tetrakis (2-ethylhexyl) thiuram disulfide (TOT-N);

sulfenamide-based vulcanization accelerators such as N-cyclohexyl-2-benzothiazolesulfenamide, N-t-butyl-2-benzothiazolyl sulfenamide, N-oxyethylene-2-benzothiazolesulfenamide, N-oxyethylene-2-benzothiazolesulfenamide, and N,N'-diisopropyl-2-benzothiazolesulfenamide; and guanidine-based vulcanization accelerators such as diphenylguanidine, di-ortho-tolylguanidine and ortho-tolylbiguanidine. These may be used alone or in combination of two or more.

(i) Other

In addition to the above components, the rubber composition may further contain additives generally used in the tire industry, such as fatty acid metal salts, carboxylic acid metal salts, and organic peroxides. Content of these additives is, for example, more than 0.1 part by mass and less than 200 parts by mass with respect to 100 parts by mass of the rubber component.

2. Production of Tread Rubber Composition

The rubber composition is produced by a general method, for example, a manufacturing method including a base kneading step of kneading a rubber component with a filler such as silica or carbon black, and a finish kneading step of kneading the kneaded product obtained in the base kneading step and a cross-linking agent.

The kneading can be performed using a known (sealed) kneader such as a banbury mixer, a kneader, or an open roll.

The kneading temperature of the base kneading step is, for example, higher than 50° C. and lower than 200° C., and the kneading time is, for example, more than 30 seconds and less than 30 minutes. In the base kneading process, in addition to the above components, compounding agents conventionally used in the rubber industry, such as softeners such as oil, stearic acid, zinc oxide, antiaging agents, waxes, and vulcanization accelerators, may be appropriately added and kneaded as needed.

In the finish kneading step, the kneaded product obtained in the base kneading step and the cross-linking agent are kneaded. The kneading temperature of the finish kneading step is, for example, above room temperature and lower than 80° C., and the kneading time is, for example, more than 1 minute and less than 15 minutes. In the finish kneading step, in addition to the above components, a vulcanization accelerator, zinc oxide and the like may be appropriately added and kneaded as needed.

3. Tire Manufacturing

The tire of the present invention is manufactured by a usual method using an unvulcanized rubber composition obtained through the finish kneading step. That is, the unvulcanized rubber composition is extruded according to the shape of tread, and is molded together with other tire members by a normal method on a tire molding machine to produce an unvulcanized tire.

Specifically, on the molded drum, the inner liner as a member to ensure the airtightness of the tire, the carcass as a member to withstand the load, impact, and filling air pressure received by the tire, a belt as a member to strongly tighten the carcass to increase the rigidity of the tread, and the like are wound, both ends of the carcass are fixed to both side edges, a bead part as a member for fixing the tire to the rim is arranged, and formed into a toroid shape. Then the tread is pasted on the center of the outer circumference, and the sidewall portion is pasted on the radial outer side to produce an unvulcanized tire.

In the present embodiment, it is preferable to provide with an inclined belt layer that extends at an angle of 15° to 300 with respect to the tire circumferential direction, as the belt. As a result, the durability of the tire is ensured while the rigidity of the tread can be sufficiently maintained. Further, since it can be restrained in the circumferential direction, it becomes easy to suppress the growth of the outer diameter.

Then, the produced unvulcanized tire is heated and pressed in a vulcanizer to obtain a tire. The vulcanization step can be carried out by applying a known vulcanization means. The vulcanization temperature is, for example, higher than 120° C. and lower than 200° C., and the vulcanization time is, for example, more than 5 minutes and less than 15 minutes.

At this time, a plurality of rib-shaped land portions are formed by the circumferential grooves extending continuously in the circumferential direction; the tread portion is formed so that Sa>Sb, when the ground contact surfaces of the tread portion is divided by the equatorial plane, and one of the divided area is Sa and the other is Sb; and the tire is molded into the shape satisfying the above (formula 1) and (formula 2) when it is installed on a standardized rim and the internal pressure is 250 KPa.

Specific tires that can satisfy the above (formula 1) and (formula 2) include tires with size notation of 145/60R18, 145/60R19, 155/55R18, 155/55R19, 155/70R17, 155/70R19, 165/55R20, 165/55R21, 165/60R19, 165/65R19, 165/70R18, 175/55R19, 175/55R20, 175/55R22, 175/60R18, 185/55R19, 185/60R20, 195/50R20, 195/55R20, etc.

In the present embodiment, the tires that can satisfy (formula 1) and (formula 2) are preferably applied to pneumatic tires for passenger cars, and satisfying the above formulas can contribute more favorably to solve the problem in the present invention of providing a pneumatic tire in which not only the rolling resistance in the tire at high-speed running is sufficiently reduced, but also the change in handling characteristics at low-speed running and high-speed running and the durability are sufficiently improved.

EXAMPLES

Hereinafter, the present invention will be described in more specific with reference to Examples.

Experiment 1

In this experiment, 175 size tires were prepared and evaluated.

1. Manufacture of Rubber Compositions for Treads

First, a rubber composition for tread was produced.

(1) Compounding Material

First, each compounding material shown below was prepared.

(a) Rubber Component (a-1) NR: TSR20

(a-2) SBR: Modified solution polymerization SBR produced according to the method described in the next paragraph. (Styrene content: 10% by mass, vinyl bond amount: 20% by mass, Mw: 250,000)

(a-3) BR: BR150 manufactured by Ube Kosan Co., Ltd.

The abovementioned SBR was produced according to the procedure shown below. First, cyclohexane, tetrahydrofuran, styrene, and 1,3-butadiene were charged into a nitrogen-substituted autoclave reactor. After adjusting the temperature of the contents of the reactor to 20° C., n-butyllithium was added to initiate polymerization. Polymerization was carried out under adiabatic conditions, and the maximum temperature reached 85° C. When the polymerization conversion reaches 99%, 1,3-butadiene was added, and then further polymerization was carried out for 5 minutes. Thereafter, N, N-bis(trimethylsilyl) -3-aminopropyltriethoxysilane was added as a modifying agent to carry out the reaction. After completion of the polymerization reaction, 2,6-di-tert-butyl-p-cresol was added. Then, the solvent was removed by steam stripping and dried by a heat roll adjusted to 110° C. to obtain the SBR.

(b) Compounding Materials Other than Rubber Components (b-1) Carbon black: Diablack N220 manufactured by Mitsubishi Chemical Corporation (b-2) Silica: Ultrasil VN3 manufactured by Evonik Co., Ltd. (BET specific surface area: 165 $m^2/g$)

(b-3) Silane coupling agent: Si266 manufactured by Degussa Co., Ltd. (Bis (3-triethoxysilylpropyl) disulfide)

(b-4) Oil: Process X-140 manufactured by Japan Energy Co., Ltd.

(b-5) Anti-aging agent: SA85 manufactured by Arizona Chemical Co., Ltd. (α-Methylstyrene resin)

(b-6) Zinc oxide: Zinc white No. 1 manufactured by Mitsui Mining & Smelting Co., Ltd.

(b-7) Stearic acid: Stearic acid "TSUBAKI" manufactured by NOF CORPORATION (b-8) Wax: Sunnoc wax manufactured by Ouchi Shinko Chemical Industry Co., Ltd.

(b-9) Anti-aging agent-1: Nocrac 6C manufactured by Ouchi Shinko Chemical Industry Co., Ltd. (N-Phenyl-N'-(1,3-dimethylbutyl)-p-phenylenediamine)

(b-10) Crosslinking agent and vulcanization accelerator Sulfur: Powdered sulfur manufactured by Tsurumi Chemical Industry Co., Ltd.

Vulcanization accelerator-1: Nocceler CZ-G (CBS) manufactured by Ouchi Shinko Chemical Industry Co., Ltd. (N-Cyclohexyl-2-benzothiazolyl sulphenamide)

Vulcanization accelerator-2: Nocceler D (DPG) manufactured by Ouchi Shinko Chemical Industry Co., Ltd. (1,3-Diphenylguanidine)

(2) Production of Rubber Composition

In accordance with the formulation shown in Table 1 and Table 2, materials other than sulfur and the vulcanization accelerator were kneaded under the conditions of 150° C. for 5 minutes using a Banbury mixer to obtain a kneaded product. Each compounding amount is a mass part.

2. Tire manufacturing Next, sulfur and a vulcanization accelerator were added to the obtained kneaded product, and the mixture was kneaded at 80° C. for 5 minutes using an open roll to obtain a tread rubber composition. A tread is formed using the obtained tread rubber composition, bonded together with other tire members to form an unvulcanized tire, which is then press-vulcanized for 10 minutes under the condition of 170° C. to produce each test tire having a size of 175 type (Example 1-1 to Example 1-5 and Comparative Example 1-1 to Comparative Example 1-5).

In each test tire, the above-mentioned ($L_{80}/L_0$) was 0.5, the total cross-sectional area of the circumferential groove was 22% of the cross-sectional area of the tread portion, and the total volume of the lateral grooves including the lateral grooves having the groove width/groove depth of 0.65 was set to 3.5% of the volume of the tread portion.

3. Parameter Calculation

After that, the outer diameter Dt (mm), the cross-sectional width Wt (mm), the cross-sectional height Ht (mm), the Sb/Sa, and the aspect ratio (%) of each test tire were obtained, and the virtual volume V ($mm^3$) was obtained. At the same time, a rubber test piece for viscoelasticity measurement was produced by cutting out from the rubber layer of the tread portion of each test tire in a length 20 mm×width 4 mm×thickness 2 mm so that the tire circumferential direction was the long side. For each rubber test piece, tan δ (15° C. tan δ) was measured under the conditions of 15° C., frequency 10 Hz, initial strain 5%, and dynamic strain 1% using an Eplexor series manufactured by GABO Co., Ltd. The thickness direction of the sample was the tire radial direction. The results are shown in Tables 1 and 2.

In addition, Sa and Sb can be obtained as follows. That is, the tire is installed on the standardized rim, the standardized internal pressure is applied, the tread surface is painted with black ink, the standardized load is applied and the tread surface is pressed against the thick paper (camber angle is 0°) so that the black ink is transferred to the paper. Specifically, the tire is rotated by 72° in the circumferential direction and, using five thick papers, the ink is transferred each at five places to obtain a transferred image. As a result, it can be considered that the shape of the ground contact surface over the entire circumference of the tire is obtained.

Then, when transfer images of the five thick papers are divided by the equatorial plane, Sa is obtained by totaling the areas of one of the contact areas (the part excluding grooves and sipes, that is, the inked area); and Sb is obtained by totaling the areas of the other contact area (the portion excluding the groove and the sipe, that is, the inked area).

Then, (Dt−2×Ht), ($Dt^2$×π/4)/Wt, (V+1.5×$10^7$)/Wt, (V+2.0×$10^7$)/Wt, (V+2.5×$10^7$)/Wt, and 15° C. tan δ×Wt were determined. The results are shown in Tables 1 and 2.

4. Performance Evaluation Test (1) Evaluation of Handling Performance

After mounting each test tire on all wheels of the vehicle (domestic FF vehicle, displacement 2000 cc) and filling it with air so that the internal pressure became 250 kPa, the driver sensually inspected the change in handling characteristics on a five-point scale from 1 (feeling a significant change) to 5 (feeling almost no change) when driving at the speed of 40 km/h and 120 km/h on the test course on the dry road surface. Then, the total score of the evaluation by 20 drivers was calculated.

Next, the result in Comparative Example 1-5 was set to 100 and the evaluation was indexed based on the following formula to evaluate the handling characteristics. The larger the value, the better the handling characteristics.

handling characteristics=[(Result of test tire)/(Result of Comparative Example 1-5)]×100

(2) Evaluation of Durability Performance

After mounting each test tire on all wheels of the vehicle (domestic FF vehicle, displacement 2000 cc) and filling it with air so that the internal pressure becomes 250 kPa, a driving 10 laps at a speed of 50 km/h, followed by climbing onto the unevenness provided on the road surface at a speed of 80 km/h was repeated on the test course on a dry road surface in an overloaded state. Thereafter, the lap was performed again at a speed of 50 km/h and then the speed was gradually increased to measure the speed at the time when the driver felt an abnormality.

Next, the result in Comparative Example 1-5 was set as 100, and the durability performance was relatively evaluated by indexing based on the following formula. The larger the value, the better the durability.

Durability=[(Result of test tire)/(Result of Comparative Example 1-5)]×100

(3) Comprehensive Evaluation

The evaluation results of (1) and (2) above were totaled to obtain a comprehensive evaluation.

(4) Evaluation Result

The results of each evaluation are shown in Tables 1 and 2.

TABLE 1

| | Example No. | | | | |
|---|---|---|---|---|---|
| SIZE | 1-1 175/40R21 | 1-2 175/40R21 | 1-3 175/40R21 | 1-4 175/50R20 | 1-5 175/60R19 |
| (Formulation) | | | | | |
| NR | 20 | 20 | 20 | 20 | 20 |
| SBR | 30 | 30 | 30 | 30 | 30 |
| BR | 50 | 50 | 50 | 50 | 50 |
| Carboneplexor | 5 | 5 | 5 | 5 | 5 |
| Silica | 120 | 100 | 80 | 120 | 120 |
| Silane coupling agent | 4.5 | 4.5 | 4.5 | 4.5 | 4.5 |
| Oil | 60 | 30 | 5 | 60 | 60 |
| Zinc oxide | 3 | 3 | 3 | 3 | 3 |
| Stearic acid | 3 | 3 | 3 | 3 | 3 |
| Anti-aging agent | 2 | 2 | 2 | 2 | 2 |
| Wax | 2 | 2 | 2 | 2 | 2 |
| Sulfur | 1.5 | 1.5 | 1.5 | 1.5 | 1.5 |
| Vulcanization accelerator-1 | 2 | 2 | 2 | 2 | 2 |
| Vulcanization accelerator-2 | 1 | 1 | 1 | 1 | 1 |
| (Parameter) | | | | | |
| 15° C. tanδ | 0.19 | 0.16 | 0.13 | 0.19 | 0.19 |
| Sb/Sa | 0.91 | 0.82 | 0.68 | 0.91 | 0.91 |
| Dt(mm) | 672 | 673 | 674 | 684 | 693 |
| V($mm^3$) | 23225099 | 23279803 | 23332669 | 29988186 | 34384955 |
| Wt(mm) | 177 | 176 | 175 | 182 | 177 |
| Ht(mm) | 69 | 70 | 70 | 88 | 105 |
| Dt-2 × Ht(mm) | 533 | 533 | 533 | 508 | 483 |
| ($Dt^2$ × π/4)/Wt | 2004 | 2021 | 2039 | 2019 | 2131 |
| (V + 1.5 × $10^7$)/Wt | 215961 | 217499 | 219044 | 247188 | 279011 |
| (V + 2.0 × $10^7$)/Wt | 244210 | 245908 | 247615 | 274660 | 307260 |
| (V + 2.5 × $10^7$)/Wt | 272458 | 274317 | 276187 | 302133 | 335508 |
| Aspect ratio (%) | 39 | 40 | 40 | 48 | 59 |
| 15° C. tanδ × Wt | 33.63 | 28.16 | 22.75 | 34.58 | 33.63 |
| (Evaluation result) | | | | | |
| Handling characteristics | 112 | 115 | 119 | 113 | 117 |
| Durability | 117 | 121 | 127 | 114 | 111 |
| Comprehensive evaluation | 229 | 236 | 246 | 227 | 228 |

TABLE 2

| | Comparative example No. | | | | |
|---|---|---|---|---|---|
| SIZE | 1-1 175/80R14 | 1-2 175/60R19 | 1-3 175/80R14 | 1-4 175/80R14 | 1-5 175/80R14 |
| (Formulation) | | | | | |
| NR | 20 | 20 | 20 | 20 | 20 |
| SBR | 30 | 30 | 30 | 30 | 30 |
| BR | 50 | 50 | 50 | 50 | 50 |
| Carbon | 5 | 5 | 5 | 5 | 5 |
| Silica | 150 | 150 | 120 | 100 | 80 |
| Silane coupling agent | 4.5 | 4.5 | 4.5 | 4.5 | 4.5 |
| Oil | 110 | 110 | 60 | 30 | 5 |
| Zinc oxide | 3 | 3 | 3 | 3 | 3 |
| Stearic acid | 3 | 3 | 3 | 3 | 3 |
| Anti-aging agent | 2 | 2 | 2 | 2 | 2 |
| Wax | 2 | 2 | 2 | 2 | 2 |
| Sulfur | 1.5 | 1.5 | 1.5 | 1.5 | 1.5 |
| Vulcanization accelerator-1 | 2 | 2 | 2 | 2 | 2 |
| Vulcanization accelerator-2 | 1 | 1 | 1 | 1 | 1 |
| (Parameter) | | | | | |
| 15° C.tanδ | 0.26 | 0.26 | 0.19 | 0.16 | 0.13 |
| Sb/Sa | 1 | 1 | 0.91 | 0.82 | 0.68 |
| Dt(mm) | 636 | 693 | 635 | 637 | 636 |
| V($mm^3$) | 38652508 | 34384955 | 38041064 | 38610099 | 38870883 |
| Wt(mm) | 177 | 177 | 175 | 176 | 178 |

TABLE 2-continued

| | Comparative example No. | | | | |
|---|---|---|---|---|---|
| SIZE | 1-1 175/80R14 | 1-2 175/60R19 | 1-3 175/80R14 | 1-4 175/80R14 | 1-5 175/80R14 |
| Ht(mm) | 140 | 105 | 140 | 141 | 140 |
| Dt-2 × Ht(mm) | 356 | 483 | 356 | 356 | 356 |
| ($Dt^2$ × π/4)/Wt | 1795 | 2131 | 1810 | 1811 | 1785 |
| (V + 1.5 × $10^7$)/Wt | 303122 | 279011 | 303092 | 304603 | 302645 |
| (V + 2.0 × $10^7$)/Wt | 331370 | 307260 | 331663 | 333012 | 330735 |
| (V + 2.5 × $10^7$)/Wt | 359619 | 335508 | 360235 | 361421 | 358825 |
| Aspect ratio (%) | 79 | 59 | 80 | 80 | 79 |
| 15° C. tanδ × Wt | 46.02 | 46.02 | 33.25 | 28.16 | 23.14 |
| (Evaluation result) | | | | | |
| Handling characteristics | 91 | 97 | 95 | 98 | 100 |
| Durability | 90 | 95 | 97 | 98 | 100 |
| Comprehensive evaluation | 181 | 192 | 192 | 196 | 200 |

Experiment 2

In this experiment, 195 size tires were prepared and evaluated.

After producing the test tires of Examples 2-1 to 2-5 and Comparative Examples 2-1 to 2-5 shown in Tables 3 and 4 in the same manner as in Experiment 1, each parameter was calculated by performing the same procedure. Then, in the same manner, a performance evaluation test was conducted and evaluated. In this experiment, the result in Comparative Example 2-5 was set as 100 for evaluation. The results of each evaluation are shown in Tables 3 and 4.

TABLE 3

| | Example No. | | | | |
|---|---|---|---|---|---|
| SIZE | 2-1 195/40R20 | 2-2 195/40R20 | 2-3 195/40R20 | 2-4 195/50R19 | 2-5 195/60R18 |
| (Formulation) | | | | | |
| NR | 20 | 20 | 20 | 20 | 20 |
| SBR | 30 | 30 | 30 | 30 | 30 |
| BR | 50 | 50 | 50 | 50 | 50 |
| Carbon | 5 | 5 | 5 | 5 | 5 |
| Silica | 120 | 100 | 80 | 120 | 120 |
| Silane coupling agent | 4.5 | 4.5 | 4.5 | 4.5 | 4.5 |
| Oil | 60 | 30 | 5 | 60 | 60 |
| Zinc oxide | 3 | 3 | 3 | 3 | 3 |
| Stearic acid | 3 | 3 | 3 | 3 | 3 |
| Anti-aging agent | 2 | 2 | 2 | 2 | 2 |
| Wax | 2 | 2 | 2 | 2 | 2 |
| Sulfur | 1.5 | 1.5 | 1.5 | 1.5 | 1.5 |
| Vulcanization accelerator-1 | 2 | 2 | 2 | 2 | 2 |
| Vulcanization accelerator-2 | 1 | 1 | 1 | 1 | 1 |
| (Parameter) | | | | | |
| 15° C. tanδ | 0.19 | 0.16 | 0.13 | 0.19 | 0.19 |
| Sb/Sa | 0.91 | 0.82 | 0.68 | 0.91 | 0.91 |
| Dt(mm) | 664 | 664 | 664 | 679 | 691 |
| V($mm^3$) | 28719183 | 28719183 | 28719183 | 36015050 | 42378735 |
| Wt(mm) | 200 | 200 | 200 | 201 | 201 |
| ($Dt^2$ × π/4)/Wt | 1731 | 1731 | 1731 | 1801 | 1866 |
| Ht(mm) | 78 | 78 | 78 | 98 | 117 |
| Dt-2 × Ht(mm) | 508 | 508 | 508 | 483 | 457 |
| (V + 1.5 × $10^7$)/Wt | 218596 | 218596 | 218596 | 253806 | 285466 |
| (V + 2.0 × $10^7$)/Wt | 243596 | 243596 | 243596 | 278682 | 310342 |
| (V + 2.5 × $10^7$)/Wt | 268596 | 268596 | 268596 | 303557 | 335218 |
| Aspect ratio (%) | 39 | 39 | 39 | 49 | 58 |
| 15° C. tanδ × Wt | 38.00 | 32.00 | 26.00 | 38.19 | 38 |
| (Evaluation result) | | | | | |
| Handling characteristics | 109 | 111 | 115 | 110 | 113 |
| Durability | 116 | 117 | 121 | 109 | 106 |
| Comprehensive evaluation | 225 | 228 | 236 | 219 | 219 |

TABLE 4

| | Comparative example No. | | | | |
|---|---|---|---|---|---|
| SIZE | 2-1<br>175/80R14 | 2-2<br>175/60R19 | 2-3<br>175/80R14 | 2-4<br>175/80R14 | 2-5<br>175/80R14 |
| (Formulation) | | | | | |
| NR | 20 | 20 | 20 | 20 | 20 |
| SBR | 30 | 30 | 30 | 30 | 30 |
| BR | 50 | 50 | 50 | 50 | 50 |
| Carbon | 5 | 5 | 5 | 5 | 5 |
| Silica | 150 | 150 | 120 | 100 | 80 |
| Silane coupling agent | 4.5 | 4.5 | 4.5 | 4.5 | 4.5 |
| Oil | 110 | 110 | 60 | 30 | 5 |
| Zinc oxide | 3 | 3 | 3 | 3 | 3 |
| Stearic acid | 3 | 3 | 3 | 3 | 3 |
| Anti-aging agent | 2 | 2 | 2 | 2 | 2 |
| Wax | 2 | 2 | 2 | 2 | 2 |
| Sulfur | 1.5 | 1.5 | 1.5 | 1.5 | 1.5 |
| Vulcanization accelerator-1 | 2 | 2 | 2 | 2 | 2 |
| Vulcanization accelerator-2 | 1 | 1 | 1 | 1 | 1 |
| (Parameter) | | | | | |
| 15° C. tanδ | 0.26 | 0.26 | 0.19 | 0.16 | 0.13 |
| Sb/Sa | 1 | 1 | 0.91 | 0.82 | 0.68 |
| Dt(mm) | 686 | 664 | 686 | 686 | 686 |
| V($mm^3$) | 44856521 | 28719183 | 44856521 | 44856521 | 44856521 |
| Wt(mm) | 201 | 200 | 201 | 201 | 201 |
| ($Dt^2 \times \pi/4$)/Wt | 1839 | 1731 | 1839 | 1839 | 1839 |
| Ht(mm) | 127 | 78 | 127 | 127 | 127 |
| Dt-2 × Ht(mm) | 432 | 508 | 432 | 432 | 432 |
| (V + 1.5 × $10^7$)/Wt | 297794 | 218596 | 297794 | 297794 | 297794 |
| (V + 2.0 × $10^7$)/Wt | 322669 | 243596 | 322669 | 322669 | 322669 |
| (V + 2.5 × $10^7$)/Wt | 347545 | 268596 | 347545 | 347545 | 347545 |
| Aspect ratio (%) | 63 | 39 | 63 | 63 | 63 |
| 15° C. tanδ × Wt | 52.26 | 52.00 | 38.19 | 32.16 | 26.13 |
| (Evaluation result) | | | | | |
| Handling characteristics | 91 | 97 | 96 | 98 | 100 |
| Durability | 90 | 95 | 98 | 99 | 100 |
| Comprehensive evaluation | 181 | 192 | 194 | 197 | 200 |

Experiment 3

In this experiment, 225 size tires were prepared and evaluated.

After producing the test tires of Examples 3-1 to 3-5 and Comparative Examples 3-1 to 3-5 shown in Tables 5 and 6 in the same manner as in Experiment 1, each parameter was calculated by performing the same procedure. Then, in the same manner, a performance evaluation test was conducted and evaluated. In this experiment, the result in Comparative Example 3-5 was set as 100 for evaluation. The results of each evaluation are shown in Tables 5 and 6.

TABLE 5

| | Example No. | | | | |
|---|---|---|---|---|---|
| SIZE | 3-1<br>225/35R22 | 3-2<br>225/35R22 | 3-3<br>225/35R22 | 3-4<br>225/50R20 | 3-5<br>225/40R21 |
| (Formulation) | | | | | |
| NR | 20 | 20 | 20 | 20 | 20 |
| SBR | 30 | 30 | 30 | 30 | 30 |
| BR | 50 | 50 | 50 | 50 | 50 |
| Carbon | 5 | 5 | 5 | 5 | 5 |
| Silica | 120 | 100 | 80 | 120 | 120 |
| Silane coupling agent | 4.5 | 4.5 | 4.5 | 4.5 | 4.5 |
| Oil | 60 | 30 | 5 | 60 | 60 |
| Zinc oxide | 3 | 3 | 3 | 3 | 3 |
| Stearic acid | 3 | 3 | 3 | 3 | 3 |
| Anti-aging agent | 2 | 2 | 2 | 2 | 2 |
| Wax | 2 | 2 | 2 | 2 | 2 |

TABLE 5-continued

| SIZE | Example No. 3-1 225/35R22 | 3-2 225/35R22 | 3-3 225/35R22 | 3-4 225/50R20 | 3-5 225/40R21 |
|---|---|---|---|---|---|
| Sulfur | 1.5 | 1.5 | 1.5 | 1.5 | 1.5 |
| Vulcanization accelerator-1 | 2 | 2 | 2 | 2 | 2 |
| Vulcanization accelerator-2 | 1 | 1 | 1 | 1 | 1 |
| (Parameter) | | | | | |
| 15° C. tanδ | 0.19 | 0.16 | 0.13 | 0.19 | 0.19 |
| Sb/Sa | 0.91 | 0.82 | 0.68 | 0.91 | 0.91 |
| Dt(mm) | 717 | 715 | 718 | 735 | 712 |
| V($mm^3$) | 36459171 | 35629276 | 36878037 | 51856443 | 40005129 |
| Wt(mm) | 230 | 228 | 231 | 234 | 229 |
| Ht(mm) | 79 | 78 | 80 | 114 | 89 |
| Dt-2 × Ht(mm) | 559 | 559 | 559 | 508 | 533 |
| ($Dt^2$ × π/4)/Wt | 1755 | 1761 | 1753 | 1813 | 1739 |
| (V + 1.5 × $10^7$)/Wt | 223736 | 222058 | 224580 | 285711 | 240197 |
| (V + 2.0 × $10^7$)/Wt | 245475 | 243988 | 246225 | 307079 | 262031 |
| (V + 2.5 × $10^7$)/Wt | 267214 | 265918 | 267870 | 328446 | 283865 |
| Aspect ratio (%) | 34 | 34 | 34 | 49 | 39 |
| 15° C. tanδ × Wt | 43.70 | 36.48 | 30.03 | 44.46 | 43.51 |
| (Evaluation result) | | | | | |
| Handling characteristics | 107 | 109 | 112 | 108 | 110 |
| Durability | 112 | 115 | 119 | 107 | 105 |
| Comprehensive evaluation | 219 | 224 | 231 | 215 | 215 |

TABLE 6

| SIZE | Comparative example No. 3-1 225/60R20 | 3-2 225/50R20 | 3-3 225/60R20 | 3-4 225/60R20 | 3-5 225/60R20 |
|---|---|---|---|---|---|
| (Formulation) | | | | | |
| NR | 20 | 20 | 20 | 20 | 20 |
| SBR | 30 | 30 | 30 | 30 | 30 |
| BR | 50 | 50 | 50 | 50 | 50 |
| Carbon | 5 | 5 | 5 | 5 | 5 |
| Silica | 150 | 150 | 120 | 100 | 80 |
| Silane coupling agent | 4.5 | 4.5 | 4.5 | 4.5 | 4.5 |
| Oil | 110 | 110 | 60 | 30 | 5 |
| Zinc oxide | 3 | 3 | 3 | 3 | 3 |
| Stearic acid | 3 | 3 | 3 | 3 | 3 |
| Anti-aging agent | 2 | 2 | 2 | 2 | 2 |
| Wax | 2 | 2 | 2 | 2 | 2 |
| Sulfur | 1.5 | 1.5 | 1.5 | 1.5 | 1.5 |
| Vulcanization accelerator-1 | 2 | 2 | 2 | 2 | 2 |
| Vulcanization accelerator-2 | 1 | 1 | 1 | 1 | 1 |
| (Parameter) | | | | | |
| 15° C. tanδ | 0.26 | 0.26 | 0.19 | 0.16 | 0.13 |
| Sb/Sa | 1 | 1 | 0.91 | 0.82 | 0.68 |
| Dt(mm) | 778 | 734 | 778 | 778 | 778 |
| V($mm^3$) | 62176957 | 50925101 | 62176957 | 61904251 | 62722369 |
| Wt(mm) | 228 | 231 | 228 | 227 | 230 |
| Ht(mm) | 135 | 113 | 135 | 135 | 135 |
| Dt-2 × Ht(mm) | 508 | 508 | 508 | 508 | 508 |
| ($Dt^2$ × π/4)/Wt | 2085 | 1832 | 2085 | 2094 | 2067 |
| (V + 1.5 × $10^7$)/Wt | 338495 | 285390 | 338495 | 338785 | 337923 |
| (V + 2.0 × $10^7$)/Wt | 360425 | 307035 | 360425 | 360812 | 359662 |
| (V + 2.5 × $10^7$)/Wt | 382355 | 328680 | 382355 | 382838 | 381402 |
| Aspect ratio (%) | 59 | 49 | 59 | 59 | 59 |
| 15° C. tanδ × Wt | 59.28 | 60.06 | 43.32 | 36.32 | 29.90 |

TABLE 6-continued

| | Comparative example No. | | | | |
|---|---|---|---|---|---|
| SIZE | 3-1<br>225/60R20 | 3-2<br>225/50R20 | 3-3<br>225/60R20 | 3-4<br>225/60R20 | 3-5<br>225/60R20 |
| | (Evaluation result) | | | | |
| Handling characteristics | 91 | 97 | 97 | 99 | 100 |
| Durability | 90 | 95 | 98 | 99 | 100 |
| Comprehensive evaluation | 181 | 192 | 195 | 198 | 200 |

Summary of Experiments 1 to 3

From the results of Experiments 1 to 3 (Tables 1 to 6), for tires of any size, 175 size, 195 size, 225 size, it turns out that pneumatic tires in which not only the rolling resistance is reduced, but also the change in handling characteristics at low-speed running and high-speed running is sufficiently suppressed, and the durability is also sufficiently improved, when Sa>Sb (Sb/Sa<1) and the above (formula 1) and (formula 2) is satisfied, can be provided.

Then, it turns out that, by satisfying each of the requirements specified in a second embodiment and thereafter, a tire having further improved change in handling characteristics at low-speed running and high-speed running and durability can be provided.

On the other hand, when either (formula 1) or (formula 2) is not satisfied, the change in handling characteristics at low-speed running and high-speed running is not sufficiently small, and the durability is not sufficiently improved.

Experiment 4

Next, three types of tires (Examples 4-1 to 4-3) in which the relationship between the virtual volume V and the cross-sectional width Wt did not differ significantly were produced with the same composition and evaluated in the same manner. Here, in addition to the above-mentioned evaluation of handling characteristics and durability performance, fuel efficiency was also evaluated.

Specifically, each test tire was mounted to all wheels of the vehicle (domestic FF vehicle, displacement 2000 cc), filled with air so that the internal pressure became 250 kPa, and then driven on the test course on the dry road surface at a speed of 100 km/h. After making a 10 km lap, the accelerator was released, and the distance from when the accelerator was turned off until the vehicle stopped was measured, as the rolling resistance of each test tire.

Next, taking the result in Example 4-3 as 100, and the results were indexed based on the following formula to relatively evaluate the fuel efficiency. The larger the value, the longer the distance from the timing when the accelerator is turned off until the vehicle stops, and the smaller the rolling resistance in the steady state, showing excellent fuel efficiency.

Fuel efficiency=[(Result of test tire)/(Result of Example 4-3)]×100

Then, as in Experiments 1 to 3, the evaluation results were totaled to make a comprehensive evaluation. The results of each evaluation are shown in Table 7.

TABLE 7

| | Example No. | | |
|---|---|---|---|
| SIZE | 4-1<br>175/55R18 | 4-2<br>195/50R19 | 4-3<br>225/45R20 |
| | (Formulation) | | |
| NR | 20 | 20 | 20 |
| SBR | 30 | 30 | 30 |
| BR | 50 | 50 | 50 |
| Carbon | 5 | 5 | 5 |
| Silica | 90 | 90 | 90 |
| Silane coupling agent | 4.5 | 4.5 | 4.5 |
| Oil | 15 | 15 | 15 |
| Zinc oxide | 3 | 3 | 3 |
| Stearic acid | 3 | 3 | 3 |
| Anti-aging agent | 2 | 2 | 2 |
| Wax | 2 | 2 | 2 |
| Sulfur | 1.5 | 1.5 | 1. 5 |
| Vulcanization accelerator-1 | 2 | 2 | 2 |
| Vulcanization accelerator-2 | 1 | 1 | 1 |
| | (Parameter) | | |
| 15° C. tanδ | 0.14 | 0.14 | 0.14 |
| Sb/Sa | 0.73 | 0.73 | 0.73 |
| Dt(mm) | 650 | 677 | 709 |
| V($mm^3$) | 30681323 | 35409871 | 43419514 |
| Wt(mm) | 183 | 200 | 226 |
| Ht(mm) | 96 | 97 | 101 |
| Dt-2 × Ht(mm) | 457 | 483 | 508 |
| ($Dt^2$ × π/4)/Wt | 1813 | 1800 | 1747 |
| (V + 1.5 × $10^7$)/Wt | 249625 | 252049 | 258493 |
| (V + 2.0 × $10^7$)/Wt | 276947 | 277049 | 280617 |
| (V + 2.5 × $10^7$)/Wt | 304270 | 302049 | 302741 |
| Aspect ratio (%) | 53 | 49 | 44 |
| 15° C. tanδ × Wt | 25.62 | 28.00 | 31.64 |
| Handling characteristics | 107 | 104 | 100 |
| Durability | 104 | 102 | 100 |
| Fuel efficiency | 111 | 106 | 100 |
| Comprehensive evaluation | 322 | 312 | 300 |

Table 7 shows that, when there is no large difference in the relationship between the virtual volume V and the cross-sectional width Wt, all the handling characteristics, durability performance and fuel efficiency are improved, as the cross-sectional width Wt becomes smaller as from less than 205 mm to less than 200 mm, and as the aspect ratio increases. That is, it can be seen a remarkable effect is exhibited.

Although the present invention has been described above based on the embodiments, the present invention is not limited to the above embodiments. Various modifications can be made to the above embodiments within the same and equal range as the present invention.

What is claimed is:

1. A pneumatic tire having a tread portion that includes a plurality of rib-shaped land portions formed by circumferential grooves extending continuously in the circumferential direction, wherein the rubber layer constituting the tread portion is formed by a rubber composition having a loss tangent (15° C. tan δ) of 0.13 or more and 0.18 or less measured under the conditions of 15° C., frequency 10 Hz, initial strain 5%, and dynamic strain rate 1%;

the rubber composition comprises at least one rubber component selected from butadiene rubber, styrene butadiene rubber, and isoprene-based rubber, when the ground contact surface of the tread portion is divided by the equatorial plane, and when one ground contact area is Sa and the other is Sb, Sa>Sb;

when the cross-sectional width of the tire is Wt (mm), the outer diameter is Dt (mm), and the volume of the space occupied by the tire is the virtual volume V ($mm^3$), when the tire is installed on a standardized rim and the internal pressure is 250 kPa, the tire satisfies (formula 1) and (formula A):

$$1600 \leq (Dt^2 \times \pi/4)/Wt \leq 2827.4 \quad \text{(formula 1)}$$

$$[(V+2.5\times10^7)/Wt] \leq 276187 \quad \text{(formula A), and}$$

oil content is less than 30 parts by mass per 100 parts by mass of the rubber component; and a plurality of lateral grooves extending in the tire axial direction are formed in the tread portion, and the total volume of the plurality of lateral grooves is 2.0 to 5.0% of the volume of the tread portion.

2. A pneumatic tire having a tread portion that includes a plurality of rib-shaped land portions formed by circumferential grooves extending continuously in the circumferential direction, wherein the rubber layer constituting the tread portion is formed by a rubber composition having a loss tangent (15° C. tan δ) of 0.13 or more and 0.18 or less measured under the conditions of 15° C., frequency 10 Hz, initial strain 5%, and dynamic strain rate 1%;

the rubber composition comprises at least one rubber component selected from butadiene rubber, styrene butadiene rubber, and isoprene-based rubber, when the ground contact surface of the tread portion is divided by the equatorial plane, and when one ground contact area is Sa and the other is Sb, Sa>Sb;

when the cross-sectional width of the tire is Wt (mm), the outer diameter is Dt (mm), and the volume of the space occupied by the tire is the virtual volume V ($mm^3$), when the tire is installed on a standardized rim and the internal pressure is 250 kPa, the tire satisfies (formula 1) and (formula 2):

$$1600 \leq (Dt^2 \times \pi/4)/Wt \leq 2827.4 \quad \text{(formula 1)}$$

$$[(V+1.5\times10^7)/Wt] \leq 2.88\times10^5 \quad \text{(formula 2),}$$

the cross-sectional width of the tire is Wt (mm) is 170 or more, the outer diameter Dt (mm) is less than 725, the cross-sectional height of the tire is Ht (mm) is 80 or less, oil content is less than 30 parts by mass per 100 parts by mass of the rubber component, and a plurality of lateral grooves extending in the tire axial direction are formed in the tread portion, and the total volume of the plurality of lateral grooves is 2.0 to 5.0% of the volume of the tread portion.

3. A pneumatic tire having a tread portion that includes a plurality of rib-shaped land portions formed by circumferential grooves extending continuously in the circumferential direction, wherein the rubber layer constituting the tread portion is formed by a rubber composition having a loss tangent (15° C. tan δ) of 0.13 or more and 0.18 or less measured under the conditions of 15° C., frequency 10 Hz, initial strain 5%, and dynamic strain rate 1%;

the rubber composition comprises at least one rubber component selected from butadiene rubber, styrene butadiene rubber, and isoprene-based rubber, when the ground contact surface of the tread portion is divided by the equatorial plane, and when one ground contact area is Sa and the other is Sb, Sa>Sb and Sb/Sa<0.7;

when the cross-sectional width of the tire is Wt (mm), the outer diameter is Dt (mm), and the volume of the space occupied by the tire is the virtual volume V ($mm^3$), when the tire is installed on a standardized rim and the internal pressure is 250 kPa, the tire satisfies (formula 1) and (formula 2):

$$1600 \leq (Dt^2 \times \pi/4)/Wt \leq 2827.4 \quad \text{(formula 1)}$$

$$[(V+1.5\times10^7)/Wt]2.88\times10^5 \quad \text{(formula 2), and}$$

oil content is less than 30 parts by mass per 100 parts by mass of the rubber component; and a plurality of lateral grooves extending in the tire axial direction are formed in the tread portion, and the total volume of the plurality of lateral grooves is 2.0 to 5.0% of the volume of the tread portion.

4. The pneumatic tire according to claim 3, wherein the 15° C. tan δ is 0.20 or less.

5. The pneumatic tire according to claim 3, wherein when the outer diameter of the tire is Dt (mm) and the cross-sectional height of the tire is Ht (mm), when the tire is installed on a standardized rim and the internal pressure is 250 kPa, (Dt−2×Ht) is 470 (mm) or more.

6. The pneumatic tire according to claim 3, wherein a plurality of circumferential grooves extending continuously in the tire circumferential direction are formed in the tread portion, and the total cross-sectional area of the plurality of circumferential grooves is 10 to 30% of the cross-sectional area of the tread portion.

7. The pneumatic tire according to claim 3, wherein when the outer diameter of the tire is Dt (mm) when the tire is installed on a standardized rim and the internal pressure is 250 kPa, the Dt is less than 685 (mm).

8. The pneumatic tire according to claim 3, wherein the rubber composition comprises a rubber component of butadiene rubber at 35 to 65 parts by mass, styrene butadiene rubber at 15 to 45 parts by mass and natural rubber at 5 to 35 parts by mass.

9. The pneumatic tire according to claim 3, wherein the tire satisfies the following (formula 3), $[(V+2.0\times10^7)/Wt] \leq 2.88\times10^5$ . . . (formula 3).

10. The pneumatic tire according to claim 9, wherein the tire satisfies the following (formula 4), $[(V+2.5\times10^7)/Wt] \leq 2.88\times10^5$ . . . (formula 4).

11. The pneumatic tire according to claim 3, wherein the cross-sectional width Wt (mm) is less than 205 mm.

12. The pneumatic tire according to claim 11, wherein the cross-sectional width Wt (mm) is less than 200 mm.

13. The pneumatic tire according to claim 3, wherein the tire has an aspect ratio of 40% or more.

14. The pneumatic tire according to claim 13, wherein the aspect ratio is 45% or more.

15. The pneumatic tire according to claim 14, wherein the aspect ratio is 47.5% or more.

16. The pneumatic tire according to claim 3, wherein the tire satisfies 15° C. tan $\delta \times Wt \leq 50$.

17. The pneumatic tire according to claim 16, wherein the tire satisfies 15° C. tan $\delta \times Wt \leq 40$.

18. The pneumatic tire according to claim 17, wherein the tire satisfies 15° C. tan $\delta \times Wt \leq 30$.

* * * * *